US012585512B2

(12) United States Patent
Sipakko et al.

(10) Patent No.: US 12,585,512 B2
(45) Date of Patent: Mar. 24, 2026

(54) CUSTOMIZED SOCKET APPLICATION PROGRAMMING INTERFACE FUNCTIONS

(71) Applicant: Nokia Solutions and Networks Oy, Espoo (FI)

(72) Inventors: Samuel Sipakko, Espoo (FI); Erkki Juhani Hietala, Espoo (FI); Kimmo Kalervo Hätönen, Espoo (FI); Jari Henry Juhani Karppinen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 19/171,788

(22) Filed: Apr. 7, 2025

(65) Prior Publication Data

US 2025/0315321 A1 Oct. 9, 2025

(30) Foreign Application Priority Data

Apr. 8, 2024 (FI) .................................... 20245434

(51) Int. Cl.
| | |
|---|---|
| *G06F 9/04* | (2006.01) |
| *G06F 9/445* | (2018.01) |
| *G06F 9/54* | (2006.01) |

(52) U.S. Cl.
CPC .......... *G06F 9/544* (2013.01); *G06F 9/44521* (2013.01)

(58) Field of Classification Search
CPC ...... G06F 9/544; G06F 9/44521; G06F 9/545; H04L 69/162
USPC ....................................................... 719/312
See application file for complete search history.

(56) References Cited

U.S. PATENT DOCUMENTS

| | | | |
|---|---|---|---|
| 7,580,915 B2 * | 8/2009 | Braun ..................... | G06F 9/544 |
| | | | 707/999.102 |
| 8,555,295 B2 | 10/2013 | Karino et al. | |
| 10,348,867 B1 | 7/2019 | Gemignani, Jr. | |
| 10,516,623 B2 | 12/2019 | Leafe et al. | |
| 2004/0205208 A1 * | 10/2004 | Koponen ............... | H04L 67/56 |
| | | | 709/233 |
| 2006/0075119 A1 | 4/2006 | Hussain et al. | |
| 2014/0059206 A1 * | 2/2014 | Venkateshwaran ... | H04L 69/162 |
| | | | 709/224 |

(Continued)

FOREIGN PATENT DOCUMENTS

WO 2016011358 A1 1/2016

OTHER PUBLICATIONS

Silas Springer "BALSA: Bundle Abstraction Layer for Socket Applications" (Year: 2024).*

(Continued)

*Primary Examiner* — Pierre Vital
*Assistant Examiner* — Abdou K Seye
(74) *Attorney, Agent, or Firm* — SQUIRE PATTON BOGGS (US) LLP

(57) ABSTRACT

Disclosed is a method comprising replacing one or more socket application programming interface functions with one or more customized socket application programming interface functions for at least one of a transmission control protocol client application or a transmission control protocol server application; and calling the one or more customized socket application programming interface functions for creating one or more shared memory channels for communication between the transmission control protocol client application and the transmission control protocol server application.

19 Claims, 9 Drawing Sheets

(56) References Cited

U.S. PATENT DOCUMENTS

| | | | | |
|---|---|---|---|---|
| 2014/0280984 A1 | 9/2014 | Raymond et al. | | |
| 2014/0304719 A1* | 10/2014 | Pope | ...................... | G06F 9/546 |
| | | | | 719/328 |
| 2017/0132173 A1 | 5/2017 | Cai et al. | | |
| 2019/0065291 A1 | 2/2019 | Macneil et al. | | |
| 2022/0019362 A1* | 1/2022 | Badiger | .................. | G06F 12/10 |
| 2022/0114055 A1* | 4/2022 | Doshi | ................. | G06F 11/1492 |
| 2023/0156060 A1 | 5/2023 | Shribman et al. | | |

OTHER PUBLICATIONS

Nedzelskyi et al., "Research of Efficiency of Multi-Core Computers with Shared Memory", 7th International Conference on Future Internet of Things and Cloud Workshops (FiCloudW), Aug. 26-28, 2019, pp. 111-114.

Hobson et al., "Shared-Memory Communication for Containerized Workflows", IEEE/ACM 21st International Symposium on Cluster, Cloud and Internet Computing (CCGrid), May 10-13, 2021, pp. 123-132.

"SHML Library Executable binary loading", Nokia, Version 0.5, 2023, pp. 1-7.

"IEEE 802.11", Wikipedia, Retrieved on Mar. 21, 2025, Webpage available at : https://en.wikipedia.org/wiki/IEEE_802.11.

"IEEE 802.15", Wikipedia, Retrieved on Mar. 21, 2025, Webpage available at : https://en.wikipedia.org/wiki/IEEE_802.15.

Office action received for corresponding Finnish Patent Application No. 20245434, dated Sep. 13, 2024, 16 pages.

Khasgiwale et al., "Shimmy: Accelerating inter-container communication for the IoT Edge", IEEE Global Communications Conference: IoT and Sensor Networks, Dec. 4-8, 2023, pp. 4461-4466.

Office action received for corresponding Finnish Patent Application No. 20245434, dated Mar. 5, 2025, 12 pages.

Li et al., "SocksDirect: Datacenter Sockets can be Fast and Compatible", Proceedings of the ACM Special Interest Group on Data Communication, Aug. 19-23, 2019, pp. 90-103.

Extended European Search Report corresponding to EP Application No. 25167681.3, dated Sep. 29, 2025.

* cited by examiner

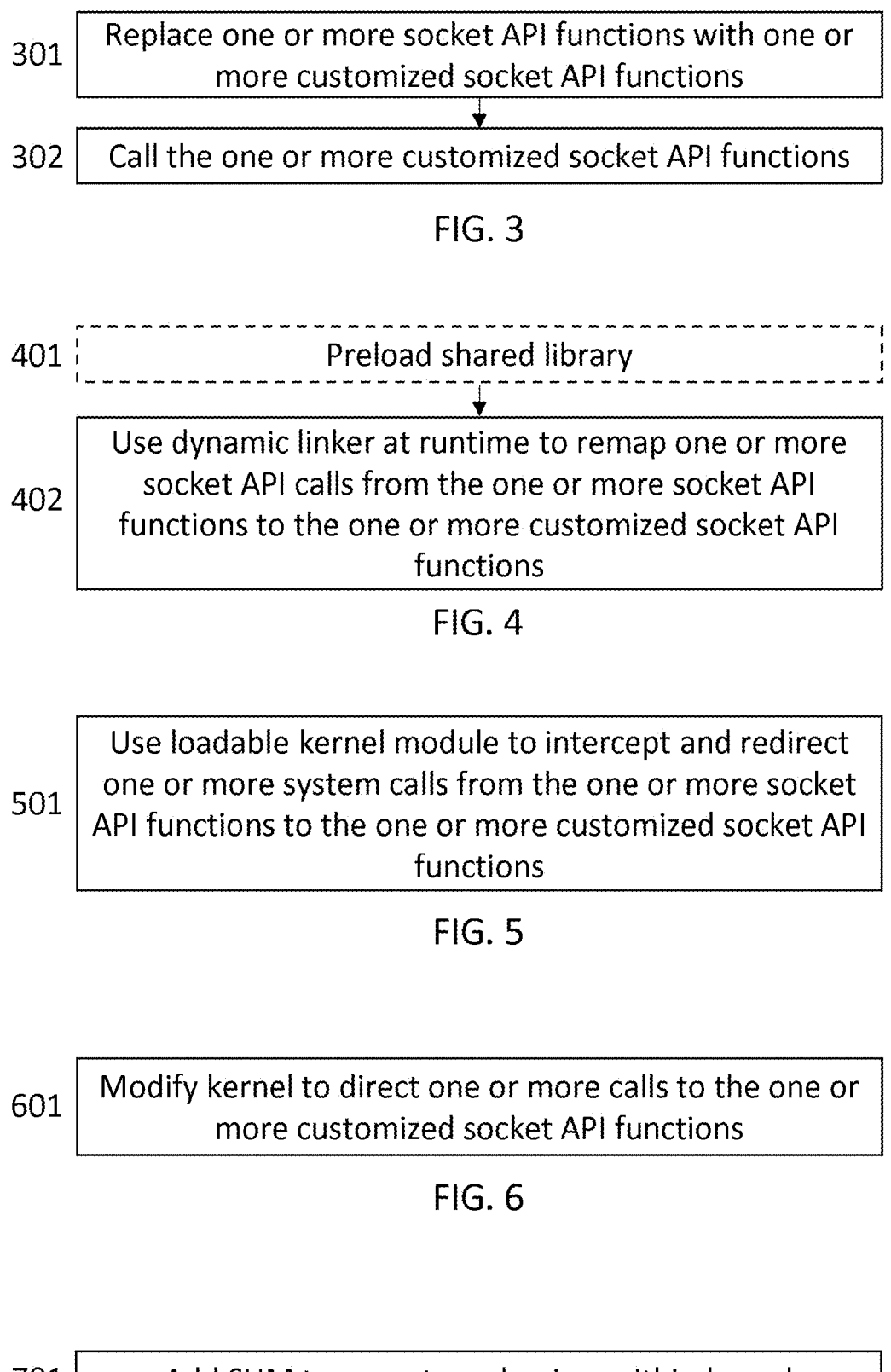

301　Replace one or more socket API functions with one or more customized socket API functions 302　Call the one or more customized socket API functions

FIG. 3

401　Preload shared library

402　Use dynamic linker at runtime to remap one or more socket API calls from the one or more socket API functions to the one or more customized socket API functions

FIG. 4

501　Use loadable kernel module to intercept and redirect one or more system calls from the one or more socket API functions to the one or more customized socket API functions

FIG. 5

601　Modify kernel to direct one or more calls to the one or more customized socket API functions

FIG. 6

701　Add SHM transport mechanism within kernel

FIG. 7

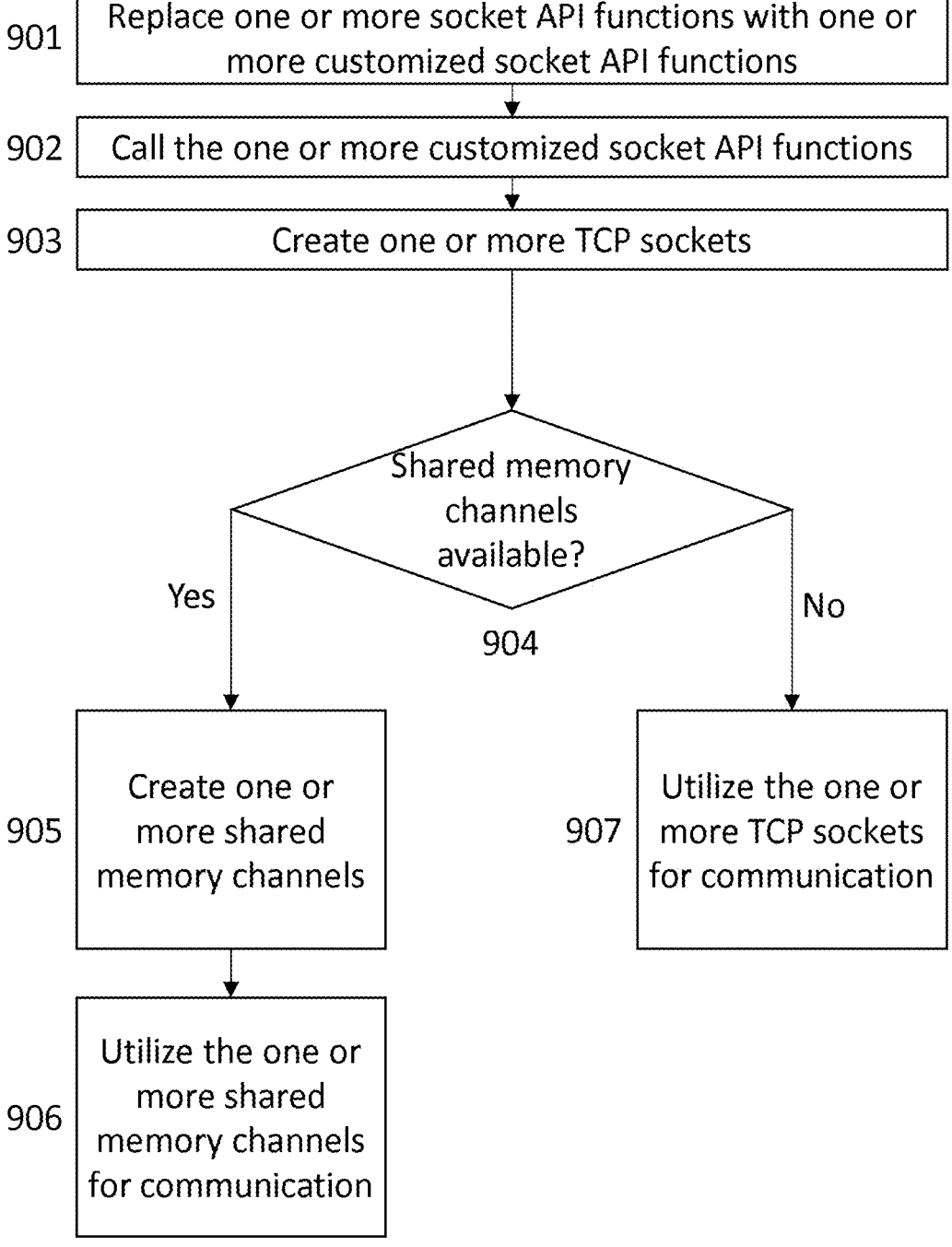

901 | Replace one or more socket API functions with one or more customized socket API functions 902 | Call the one or more customized socket API functions 903 | Create one or more TCP sockets Shared memory channels available?

904

Yes

No

905 | Create one or more shared memory channels

907 | Utilize the one or more TCP sockets for communication

906 | Utilize the one or more shared memory channels for communication

CUSTOMIZED SOCKET APPLICATION PROGRAMMING INTERFACE FUNCTIONS

RELATED APPLICATION

This application claims priority to the Finnish Patent Application No. 20245434, filed on Apr. 8, 2024, the content of which is incorporated herein by reference in its entirety.

TECHNICAL FIELD

The following example embodiments relate to communication systems.

BACKGROUND

Transmission control protocol sockets are endpoints in network communication where a connection may be established for the two-way exchange of data using the transmission control protocol (TCP). However, communication over TCP may be suboptimal in terms of latency, throughput, and computational efficiency.

SUMMARY

The scope of protection sought for various example embodiments is set out by the claims. The example embodiments and features, if any, described in this specification that do not fall under the scope of the claims are to be interpreted as examples useful for understanding various embodiments.

According to a first aspect, there is provided an apparatus comprising: means for replacing one or more socket application programming interface functions with one or more customized socket application programming interface functions for at least one of a transmission control protocol client application or a transmission control protocol server application, wherein the one or more socket application programming interface functions are configured at least to create one or more transmission control protocol sockets for communication between the transmission control protocol client application and the transmission control protocol server application, wherein the one or more customized socket application programming interface functions are configured at least to create one or more shared memory channels for the communication between the transmission control protocol client application and the transmission control protocol server application; and means for calling the one or more customized socket application programming interface functions for creating the one or more shared memory channels for the communication between the transmission control protocol client application and the transmission control protocol server application.

According to a second aspect, there is provided the apparatus of the first aspect, wherein the replacing is performed without modifying any source code of the transmission control protocol client application and the transmission control protocol server application.

According to a third aspect, there is provided the apparatus of any of the first or second aspects, wherein the replacing comprises remapping one or more socket application programming interface calls from the one or more socket application programming interface functions to the one or more customized socket application programming interface functions by using a dynamic linker at a runtime of the at least one of the transmission control protocol client application or the transmission control protocol server application.

According to a fourth aspect, there is provided the apparatus of any of the first to third aspects, wherein the apparatus further comprises means for preloading a shared library into the transmission control protocol client application and the transmission control protocol server application when starting the transmission control protocol client application and the transmission control protocol server application, wherein the shared library comprises the one or more customized socket application programming interface functions.

According to a fifth aspect, there is provided the apparatus of any of the first to third aspects, wherein the one or more customized socket application programming interface functions are comprised in a shared library integrated into the transmission control protocol client application and the transmission control protocol server application prior to starting the transmission control protocol client application and the transmission control protocol server application.

According to a sixth aspect, there is provided the apparatus of any of the first or second aspects, wherein the one or more customized socket application programming interface functions are comprised in a kernel of an operating system of the apparatus.

According to a seventh aspect, there is provided the apparatus of the sixth aspect, wherein the replacing comprises using a loadable kernel module to intercept and redirect one or more system calls from the one or more socket application programming interface functions to the one or more customized socket application programming interface functions.

According to an eighth aspect, there is provided the apparatus of the sixth aspect, wherein the replacing comprises modifying the kernel of the operating system of the apparatus to direct one or more calls to the one or more customized socket application programming interface functions.

According to a ninth aspect, there is provided the apparatus of the sixth aspect, further comprising means for adding, within the kernel of the operating system of the apparatus, a transport mechanism for utilizing the one or more shared memory channels for the communication between the transmission control protocol client application and the transmission control protocol server application, wherein the one or more customized socket application programming interface functions are configured to support the transport mechanism added within the kernel.

According to a tenth aspect, there is provided the apparatus of any of the first to ninth aspects, wherein the one or more customized socket application programming interface functions are further configured to create the one or more transmission control protocol sockets.

According to an eleventh aspect, there is provided the apparatus of the tenth aspect, further comprising means for creating the one or more shared memory channels based on a type and an address of the one or more transmission control protocol sockets.

According to a twelfth aspect, there is provided the apparatus of any of the tenth or eleventh aspects, wherein the one or more customized socket application programming interface functions are further configured to: associate the one or more transmission control protocol sockets with a context indicating a possibility for using the one or more shared memory channels as an alternative to the one or more transmission control protocol sockets, and start the at least one of the transmission control protocol client application or the transmission control protocol server application based on the context indicating the possibility for using the one or more shared memory channels, such that the at least one of the transmission control protocol client application or the transmission control protocol server application is configured to support the one or more shared memory channels for the communication between the transmission control protocol client application and the transmission control protocol server application.

According to a thirteenth aspect, there is provided the apparatus of the twelfth aspect, further comprising: means for performing one or more further socket application programming interface calls associated with one or more socket file descriptors; means for determining whether the one or more socket file descriptors are associated with the context indicating the possibility for using the one or more shared memory channels; and means for utilizing the one or more shared memory channels for the communication between the transmission control protocol client application and the transmission control protocol server application according to the one or more further socket application programming interface calls, based at least on determining that the one or more socket file descriptors are associated with the context.

According to a fourteenth aspect, there is provided the apparatus of any of the first to thirteenth aspects, further comprising: means for determining whether the one or more shared memory channels are available for the communication; and means for utilizing the one or more shared memory channels for the communication between the transmission control protocol client application and the transmission control protocol server application, based at least on determining that the one or more shared memory channels are available for the communication.

According to a fifteenth aspect, there is provided the apparatus of any of the first to fourteenth aspects, further comprising: means for determining whether the transmission control protocol client application and the transmission control protocol server application are capable of utilizing the one or more shared memory channels; and means for utilizing the one or more shared memory channels for the communication between the transmission control protocol client application and the transmission control protocol server application, based at least on determining that the transmission control protocol client application and the transmission control protocol server application are capable of utilizing the one or more shared memory channels.

According to a sixteenth aspect, there is provided the apparatus of any of the thirteenth to fifteenth aspects, wherein the utilization of the one or more shared memory channels for the communication comprises at least one of: writing, by the transmission control protocol client application or the transmission control protocol server application, one or more messages in the one or more shared memory channels; or reading, by the transmission control protocol server application or the transmission control protocol client application, the one or more messages from the one or more shared memory channels.

According to a seventeenth aspect, there is provided the apparatus of any of the first to twelfth aspects, further comprising: means for determining whether the one or more shared memory channels are available for the communication; and means for utilizing the one or more transmission control protocol sockets for the communication between the transmission control protocol client application and the transmission control protocol server application, based on determining that the one or more shared memory channels are not available for the communication.

According to an eighteenth aspect, there is provided the apparatus of any of the first to seventeenth aspects, further comprising: means for detecting a failure associated with the one or more shared memory channels; and means for utilizing, based on detecting the failure, the one or more transmission control protocol sockets for the communication between the transmission control protocol client application and the transmission control protocol server application.

According to a nineteenth aspect, there is provided the apparatus of any of the first to eighteenth aspects, wherein the one or more shared memory channels are comprised in one or more anonymous memory files.

According to a twentieth aspect, there is provided the apparatus of any of the first to eighteenth aspects, further comprising means for allocating a name or an identifier to the one or more shared memory channels for identifying and accessing the one or more shared memory channels.

According to a twenty-first aspect, there is provided the apparatus of any of the first to twentieth aspects, wherein the transmission control protocol client application is comprised in a first container within a host, and the transmission control protocol server application is comprised in a second container within the host, wherein the apparatus comprises the host.

According to a twenty-second aspect, there is provided the apparatus of any of the first to twentieth aspects, wherein the transmission control protocol client application is comprised in a first container within a first host, and the transmission control protocol server application is comprised in a second container within a second host different from the first host, wherein the apparatus comprises the first host or the second host.

According to a twenty-third aspect, there is provided the apparatus of any of the first to twenty-second aspects, wherein the one or more shared memory channels are based on a memory interconnect.

According to a twenty-fourth aspect, there is provided a method comprising: replacing one or more socket application programming interface functions with one or more customized socket application programming interface functions for at least one of a transmission control protocol client application or a transmission control protocol server application, wherein the one or more socket application programming interface functions are configured at least to create one or more transmission control protocol sockets for communication between the transmission control protocol client application and the transmission control protocol server application, wherein the one or more customized socket application programming interface functions are configured at least to create one or more shared memory channels for the communication between the transmission control protocol client application and the transmission control protocol server application; and calling the one or more customized socket application programming interface functions for creating the one or more shared memory channels for the communication between the transmission control protocol client application and the transmission control protocol server application.

According to a twenty-fifth aspect, there is provided a computer program comprising instructions which, when executed by an apparatus, cause the apparatus to perform at least the following: replacing one or more socket application programming interface functions with one or more customized socket application programming interface functions for at least one of a transmission control protocol client application or a transmission control protocol server application, wherein the one or more socket application programming interface functions are configured at least to create one or more transmission control protocol sockets for communication between the transmission control protocol client application and the transmission control protocol server application, wherein the one or more customized socket application programming interface functions are configured at least to create one or more shared memory channels for the communication between the transmission control protocol client application and the transmission control protocol server application; and calling the one or more customized socket application programming interface functions for creating the one or more shared memory channels for the communication between the transmission control protocol client application and the transmission control protocol server application.

According to a twenty-sixth aspect, there is provided a system comprising at least a first host comprising a transmission control protocol client application, and a second host comprising a transmission control protocol server application. The first host comprises: means for replacing one or more socket application programming interface functions with one or more customized socket application programming interface functions for the transmission control protocol client application, wherein the one or more socket application programming interface functions are configured at least to create one or more transmission control protocol sockets for communication between the transmission control protocol client application and the transmission control protocol server application, wherein the one or more customized socket application programming interface functions are configured at least to create one or more shared memory channels for the communication between the transmission control protocol client application and the transmission control protocol server application; and means for calling the one or more customized socket application programming interface functions for creating the one or more shared memory channels for the communication between the transmission control protocol client application and the transmission control protocol server application. The second host comprises: means for replacing the one or more socket application programming interface functions with the one or more customized socket application programming interface functions for the transmission control protocol server application; and means for calling the one or more customized socket application programming interface functions for creating the one or more shared memory channels for the communication between the transmission control protocol client application and the transmission control protocol server application.

According to a twenty-seventh aspect, there is provided an apparatus comprising at least one processor, and at least one memory storing instructions that, when executed by the at least one processor, cause the apparatus at least to: replace one or more socket application programming interface functions with one or more customized socket application programming interface functions for at least one of a transmission control protocol client application or a transmission control protocol server application, wherein the one or more socket application programming interface functions are configured at least to create one or more transmission control protocol sockets for communication between the transmission control protocol client application and the transmission control protocol server application, wherein the one or more customized socket application programming interface functions are configured at least to create one or more shared memory channels for the communication between the transmission control protocol client application and the transmission control protocol server application; and call the one or more customized socket application programming interface functions for creating the one or more shared memory channels for the communication between the transmission control protocol client application and the transmission control protocol server application.

According to a twenty-eighth aspect, there is provided a non-transitory computer readable medium comprising program instructions which, when executed by an apparatus, cause the apparatus to perform at least the following: replacing one or more socket application programming interface functions with one or more customized socket application programming interface functions for at least one of a transmission control protocol client application or a transmission control protocol server application, wherein the one or more socket application programming interface functions are configured at least to create one or more transmission control protocol sockets for communication between the transmission control protocol client application and the transmission control protocol server application, wherein the one or more customized socket application programming interface functions are configured at least to create one or more shared memory channels for the communication between the transmission control protocol client application and the transmission control protocol server application; and calling the one or more customized socket application programming interface functions for creating the one or more shared memory channels for the communication between the transmission control protocol client application and the transmission control protocol server application.

According to a twenty-ninth aspect, there is provided a computer readable medium comprising program instructions which, when executed by an apparatus, cause the apparatus to perform at least the following: replacing one or more socket application programming interface functions with one or more customized socket application programming interface functions for at least one of a transmission control protocol client application or a transmission control protocol server application, wherein the one or more socket application programming interface functions are configured at least to create one or more transmission control protocol sockets for communication between the transmission control protocol client application and the transmission control protocol server application, wherein the one or more customized socket application programming interface functions are configured at least to create one or more shared memory channels for the communication between the transmission control protocol client application and the transmission control protocol server application; and calling the one or more customized socket application programming interface functions for creating the one or more shared memory channels for the communication between the transmission control protocol client application and the transmission control protocol server application.

According to a thirtieth aspect, there is provided a system comprising at least a first host comprising a transmission control protocol client application, and a second host comprising a transmission control protocol server application. The first host is configured to: replace one or more socket application programming interface functions with one or more customized socket application programming interface functions for the transmission control protocol client application, wherein the one or more socket application programming interface functions are configured at least to create one or more transmission control protocol sockets for communication between the transmission control protocol client application and the transmission control protocol server application, wherein the one or more customized socket application programming interface functions are configured at least to create one or more shared memory channels for the communication between the transmission control protocol client application and the transmission control protocol server application; and call the one or more customized socket application programming interface functions for creating the one or more shared memory channels for the communication between the transmission control protocol client application and the transmission control protocol server application. The second host is configured to: replace the one or more socket application programming interface functions with the one or more customized socket application programming interface functions for the transmission control protocol server application; and call the one or more customized socket application programming interface functions for creating the one or more shared memory channels for the communication between the transmission control protocol client application and the transmission control protocol server application.

BRIEF DESCRIPTION OF THE DRAWINGS

In the following, various example embodiments will be described in greater detail with reference to the accompanying drawings, in which

FIG. 3 illustrates a flow chart;

FIG. 4 illustrates a flow chart;

FIG. 5 illustrates a flow chart;

FIG. 6 illustrates a flow chart;

FIG. 7 illustrates a flow chart;

FIG. 9 illustrates a flow chart;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments within the scope of the claims. Furthermore, the words "comprising" and "including" should be understood as not limiting the described embodiments to consist of only those features that have been mentioned, and such embodiments may also contain features that have not been specifically mentioned. Reference numbers, in the description and/or in the claims, serve to illustrate the embodiments with reference to the drawings, without limiting the embodiments to these examples only.

Some example embodiments described herein may be implemented in a wireless communication network comprising a radio access network based on one or more of the following radio access technologies (RATs): global system for mobile communications (GSM) or any other second generation (2G) radio access technology, universal mobile telecommunication system (UMTS, 3G) based on basic wideband-code division multiple access (W-CDMA), high-speed packet access (HSPA), long term evolution (LTE), LTE-Advanced, fourth generation (4G), fifth generation (5G), 5G new radio (NR), 5G-Advanced (i.e., 3GPP NR Rel-18 and beyond), or sixth generation (6G). Some examples of radio access networks include the universal mobile telecommunications system (UMTS) radio access network (UTRAN), the evolved universal terrestrial radio access network (E-UTRA), or the next generation radio access network (NG-RAN). The wireless communication network may further comprise a core network, and some example embodiments may also be applied to network functions of the core network.

It should be noted that the embodiments are not restricted to the wireless communication network given as an example, but a person skilled in the art may also apply the solution to other wireless communication networks or systems provided with necessary properties. For example, some example embodiments may also be applied to a communication system based on IEEE 802.11 specifications, or a communication system based on IEEE 802.15 specifications. IEEE is an abbreviation for the Institute of Electrical and Electronics Engineers.

Figure 1:
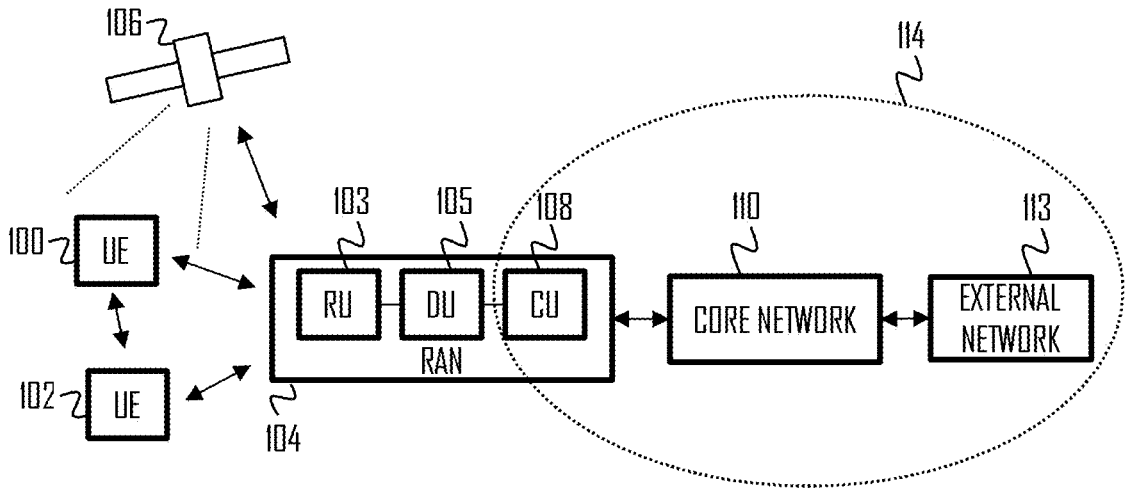
FIG. 1 illustrates an example of a wireless communication network.

FIG. 1 depicts an example of a simplified wireless communication network showing some physical and logical entities. The connections shown in FIG. 1 may be physical connections or logical connections. It is apparent to a person skilled in the art that the wireless communication network may also comprise other physical and logical entities than those shown in FIG. 1.

The example embodiments described herein are not, however, restricted to the wireless communication network given as an example but a person skilled in the art may apply the example embodiments described herein to other wireless communication networks provided with necessary properties.

The example wireless communication network shown in FIG. 1 includes a radio access network (RAN) and a core network 110.

FIG. 1 shows user equipment (UE) 100, 102 configured to be in a wireless connection on one or more communication channels in a radio cell with an access node 104 of a radio access network.

The access node 104 may comprise a computing device configured to control the radio resources of the access node 104 and to be in a wireless connection with one or more UEs 100, 102. The access node 104 may also be referred to as a base station, a base transceiver station (BTS), an access point, a cell site, a network node, a radio access network node, or a RAN node. In this description, the terms "access node" and "radio access network node" may be used interchangeably.

The access node 104 may be, for example, an evolved NodeB (abbreviated as eNB or eNodeB), or a next generation evolved NodeB (abbreviated as ng-eNB), or a next generation NodeB (abbreviated as gNB or gNodeB), providing the radio cell. The access node 104 may include or be coupled to transceivers. From the transceivers of the access node 104, a connection may be provided to an antenna unit that establishes a bi-directional radio link to one or more UEs 100, 102. The antenna unit may comprise an antenna or antenna element, or a plurality of antennas or antenna elements.

The wireless connection (e.g., radio link) from a UE 100, 102 to the access node 104 may be called uplink (UL) or reverse link, and the wireless connection (e.g., radio link) from the access node 104 to the UE 100, 102 may be called downlink (DL) or forward link. A UE 100 may also communicate directly with another UE 102, and vice versa, via a wireless connection generally referred to as a sidelink (SL). It should be appreciated that the access node 104 or its functionalities may be implemented by using any node, host, server, access point or other entity suitable for providing such functionalities.

The radio access network may comprise more than one access node 104, in which case the access nodes may also be configured to communicate with one another over wired or wireless links. These links between access nodes may be used for sending and receiving control plane signaling and also for routing data from one access node to another access node.

The access node 104 may further be connected to a core network (CN) 110. The core network 110 may comprise an evolved packet core (EPC) network and/or a 5th generation core network (5GC). The EPC may comprise network entities, such as a serving gateway (S-GW for routing and forwarding data packets), a packet data network gateway (P-GW) for providing connectivity of UEs to external packet data networks, and/or a mobility management entity (MME). The 5GC may comprise one or more network functions, such as at least one of: a user plane function (UPF), an access and mobility management function (AMF), a location management function (LMF), and/or a session management function (SMF).

The core network 110 may also be able to communicate with one or more external networks 113, such as a public switched telephone network or the Internet, or utilize services provided by them. For example, in 5G wireless communication networks, the UPF of the core network 110 may be configured to communicate with an external data network via an N6 interface. In LTE wireless communication networks, the P-GW of the core network 110 may be configured to communicate with an external data network.

It should also be understood that the distribution of functions between core network operations and access node operations may differ in future wireless communication networks compared to that of the LTE or 5G, or even be non-existent.

The illustrated UE 100, 102 is one type of an apparatus to which resources on the air interface may be allocated and assigned. The UE 100, 102 may also be called a wireless communication device, a subscriber unit, a mobile station, a remote terminal, an access terminal, a user terminal, a terminal device, or a user device, just to mention but a few names. The UE 100, 102 may be a computing device operating with or without a subscriber identification module (SIM), including, but not limited to, the following types of computing devices: a mobile phone, a smartphone, a personal digital assistant (PDA), a handset, a computing device comprising a wireless modem (e.g., an alarm or measurement device, etc.), a laptop computer, a desktop computer, a tablet, a game console, a notebook, a multimedia device, a reduced capability (RedCap) device, a wearable device (e.g., a watch, earphones or eyeglasses) with radio parts, a sensor comprising a wireless modem, or a computing device comprising a wireless modem integrated in a vehicle.

It should be appreciated that the UE 100, 102 may also be a nearly exclusive uplink-only device, of which an example may be a camera or video camera loading images or video clips to a network. The UE 100, 102 may also be a device having capability to operate in an Internet of Things (IoT) network, which is a scenario in which objects may be provided with the ability to transfer data over a network without requiring human-to-human or human-to-computer interaction.

The wireless communication network may also be able to support the usage of cloud services. For example, at least part of core network operations may be carried out as a cloud service (this is depicted in FIG. 1 by "cloud" 114). The UE 100, 102 may also utilize the cloud 114. In some applications, the computation for a given UE may be carried out in the cloud 114 or in another UE.

The wireless communication network may also comprise a central control entity, such as a network management system (NMS), or the like. The NMS is a centralized suite of software and hardware used to monitor, control, and administer the network infrastructure. The NMS is responsible for a wide range of tasks such as fault management, configuration management, security management, performance management, and accounting management. The NMS enables network operators to efficiently manage and optimize network resources, ensuring that the network delivers high performance, reliability, and security.

5G enables using multiple-input and multiple-output (MIMO) antennas in the access node 104 and/or the UE 100, 102, many more base stations or access nodes than an LTE network (a so-called small cell concept), including macro sites operating in co-operation with smaller stations and employing a variety of radio technologies depending on service needs, use cases and/or spectrum available. 5G wireless communication networks may support a wide range of use cases and related applications including video streaming, augmented reality, different ways of data sharing and various forms of machine-type applications, such as (massive) machine-type communications (mMTC), including vehicular safety, different sensors and real-time control.

In 5G wireless communication networks, access nodes and/or UEs may have multiple radio interfaces, such as below 6 gigahertz (GHz), centimeter wave (cmWave) and millimeter wave (mmWave), and also being integrable with legacy radio access technologies, such as LTE. Integration with LTE may be implemented, for example, as a system, where macro coverage may be provided by LTE, and 5G radio interface access may come from small cells by aggregation to LTE. In other words, a 5G wireless communication network may support both inter-RAT operability (such as interoperability between LTE and 5G) and inter-RI operability (inter-radio interface operability, such as between below 6 GHz, cmWave, and mmWave).

5G wireless communication networks may also apply network slicing, in which multiple independent and dedicated virtual sub-networks (network instances) may be created within the same physical infrastructure to run services that have different requirements on latency, reliability, throughput and mobility.

5G may enable analytics and knowledge generation to occur at the source of the data. This approach may involve leveraging resources that may not be continuously connected to a network, such as laptops, smartphones, tablets and sensors. Multi-access edge computing (MEC) may provide a distributed computing environment for application and service hosting. It may also have the ability to store and process content in close proximity to cellular subscribers for faster response time. Edge computing may cover a wide range of technologies, such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

In one embodiment, an access node 104 may comprise: a radio unit (RU) 103 comprising a radio transceiver (TRX), i.e., a transmitter (Tx) and a receiver (Rx); one or more distributed units (DUs) 105 that may be used for the so-called Layer 1 (L1) processing and real-time Layer 2 (L2) processing; and a central unit (CU) 108 (also known as a centralized unit) that may be used for non-real-time L2 and Layer 3 (L3) processing. The CU 108 may be connected to the one or more DUs 105 for example via an F1 interface. Such an embodiment of the access node 104 may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU 108 may be a logical node hosting radio resource control (RRC), service data adaptation protocol (SDAP) and/or packet data convergence protocol (PDCP), of the NR protocol stack for an access node 104. The CU 108 may comprise a control plane (CU-CP), which may be a logical node hosting the RRC and the control plane part of the PDCP protocol of the NR protocol stack for the access node 104. The CU 108 may further comprise a user plane (CU-UP), which may be a logical node hosting the user plane part of the PDCP protocol and the SDAP protocol of the CU for the access node 104.

The DU 105 may be a logical node hosting radio link control (RLC), medium access control (MAC) and/or physical (PHY) layers of the NR protocol stack for the access node 104. The operations of the DU 105 may be at least partly controlled by the CU 108. It should also be understood that the distribution of functions between the DU 105 and the CU 108 may vary depending on the implementation. In one embodiment, the DU may be implemented on so-called bare metal solutions, for example application-specific integrated circuit (ASIC) or customer-specific standard product (CSSP) system-on-a-chip (SoC).

5G (or new radio, NR) wireless communication networks may support multiple hierarchies, where multi-access edge computing (MEC) servers may be placed between the core network 110 and the access node 104. It should be appreciated that MEC may be applied in LTE wireless communication networks as well.

A 5G wireless communication network ("5G network") may also comprise a non-terrestrial communication network, such as a satellite communication network, to enhance or complement the coverage of the 5G radio access network. For example, satellite communication may support the transfer of data between the 5G radio access network and the core network 110, enabling more extensive network coverage. Possible use cases may include: providing service continuity for machine-to-machine (M2M) or Internet of Things (IoT) devices or for passengers on board of vehicles, or ensuring service availability for critical communications, and future railway, maritime, or aeronautical communications. Satellite communication may utilize geostationary earth orbit (GEO) satellite systems, but also low earth orbit (LEO) satellite systems, in particular mega-constellations (i.e., systems in which hundreds of (nano) satellites are deployed). A given satellite 106 in the mega-constellation may cover several satellite-enabled network entities that create on-ground cells. The on-ground cells may be created through an on-ground relay access node or by an access node located on-ground or in a satellite.

It is obvious for a person skilled in the art that the access node 104 depicted in FIG. 1 is just an example of a part of a radio access network, and in practice the radio access network may comprise a plurality of access nodes 104, the UEs 100, 102 may have access to a plurality of radio cells, and the radio access network may also comprise other apparatuses, such as physical layer relay access nodes or other entities. At least one of the access nodes may be a Home eNodeB or a Home gNodeB. A Home gNodeB or a Home eNodeB is a type of access node that may be used to provide indoor coverage inside a home, office, or other indoor environment.

Additionally, in a geographical area of a radio access network, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The access node(s) 104 of FIG. 1 may provide any kind of these cells. A cellular radio network may be implemented as a multilayer access networks including several kinds of radio cells. In multilayer access networks, one access node may provide one kind of a radio cell or radio cells, and thus a plurality of access nodes may be needed to provide such a multilayer access network.

For fulfilling the need for improving performance of radio access networks, the concept of "plug-and-play" access nodes may be introduced. A radio access network, which may be able to use "plug-and-play" access nodes, may include, in addition to Home eNodeBs or Home gNodeBs, a Home Node B gateway (HNB-GW) (not shown in FIG. 1). An HNB-GW, which may be installed within an operator's radio access network, may aggregate traffic from a large number of Home eNodeBs or Home gNodeBs back to a core network 110 of the operator.

6G wireless communication networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G may include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

Edge cloud may be brought into the radio access network by utilizing network function virtualization (NFV) and software defined networking (SDN). Using edge cloud may mean access node operations to be carried out, at least partly, in a computing system operationally coupled to a remote radio head (RRH) or a radio unit (RU) 103 of an access node 104. It is also possible that access node operations may be performed on a distributed computing system or a cloud computing system located at the access node 104. Application of cloud RAN architecture enables RAN real-time functions being carried out at the radio access network (e.g., in a DU 105), and non-real-time functions being carried out in a centralized manner (e.g., in a CU 108).

Cloud computing systems may also be used to provide the CU 108 and/or DU 105. A CU provided by a cloud computing system may be referred to as a virtualized CU (vCU). In addition to the vCU, there may also be a virtualized DU (vDU) provided by a cloud computing system. The vCU may comprise a control plane (vCU-CP), which may be a logical node hosting the RRC and the control plane part of the PDCP protocol of the NR protocol stack. The vCU may further comprise a user plane (vCU-UP), which may be a logical node hosting the user plane part of the PDCP protocol and the SDAP protocol of the vCU.

Radio access networks are starting to be converted into cloud networks in 5G-Advanced, and they may be increasingly cloud-based in 6G. The cloud RAN network may be split into real-time and non-real-time parts. The real-time parts (e.g., vDU) are located closer to the radio units 103 in distributed RAN (D-RAN) locations (i.e., cell sites) or in centralized RAN (C-RAN) locations further away from the cell sites. The non-real time parts (e.g., vCU-UP and vCU-CP) may be located more flexibly in the network (e.g., in aggregated edge locations for example 100 kilometers from cell sites). Multiple instances of vCU-UP may be deployed to handle different network slices, for example for enhanced mobile broadband (eMBB) and ultra-reliable low latency communications (URLLC) processing in different locations, to provide smaller latencies. Cloud native technologies provide a flexible way to manage workloads and distribute applications in an optimal location.

Currently, communication in radio networks is based on message passing in a distributed environment. Networking protocols such as the transmission control protocol/internet protocol (TCP/IP) may be used to send the datagrams over the ethernet. Communication may be realized by reserving a socket for each communication participant. This same mechanism may be used for internal messaging in one node (e.g., access node 104) as well as between different nodes. When a message is transmitted from a sender to a receiver through an internet protocol (IP) network, a copy of the message is created at each phase, when the context of handling the message changes. This will cause multiple copies of the message to be created over the whole transit path.

TCP/IP is a communication protocol by which network devices may interconnect on the internet and communicate with each other. Applications using the TCP/IP protocol may use the socket application programming interface (API) to connect and share the data stream between client and server applications.

A socket is a component in computer networking that facilitates communication between devices over IP networks. A socket serves as an endpoint for data exchange, enabling efficient and reliable transmission of information. Sockets may be used to establish connections, send and receive data, and manage communication protocols.

In IP networks, there are different types of sockets available to suit specific communication requirements. Stream sockets, such as transmission control protocol (TCP) sockets, provide a reliable and connection-oriented mode of communication. They ensure that data is delivered in the correct order and without loss. On the other hand, datagram sockets, also known as user datagram protocol (UDP) sockets, offer a more unreliable and connectionless mode of communication. With UDP sockets, individual packets of data, known as datagrams, may arrive out of order or be lost.

A given socket is associated with a socket address, which comprises an IP address and a port number. The IP address identifies the network node (device) participating in the communication, while the port number distinguishes multiple network services running on that device. Socket addressing enables applications to establish connections with specific destinations and allows for multiplexing of multiple connections on a single device.

Sockets play a key role in IP communication, allowing applications to communicate with remote devices over IP networks. Sockets also serve as the foundation for establishing connections, exchanging data, and implementing higher-level protocols such as the hypertext transfer protocol (HTTP), file transfer protocol (FTP), and secure shell protocol (SSH).

The socket API is a programming interface that developers may utilize to interact with sockets. The socket API provides a set of functions and data structures that allow applications to create, configure, and manage sockets. The socket API abstracts the underlying network protocols and provides a standardized interface for application-level communication. Some examples of socket API functions are described in the following.

socket( ): creates a new socket, specifying its domain (e.g., IPv4, IPV6), type (e.g., stream or datagram), and protocol, and returns a socket descriptor.

bind( ): associates a socket with a local address and port number, making it ready to receive connections on that address.

listen( ): marks the socket as a passive socket that will be used to accept incoming connection requests using accept( ), specifying the maximum number of pending connections.

accept( ): waits for an incoming connection on a listening socket, then returns a new socket descriptor for the established connection.

connect( ): initiates a connection on a socket to a remote address specified, typically used by client-side applications.

send( ): sends data on a connected socket to the peer it is connected to.

recv( ): receives data from a connected socket, usually blocking until data is available from the peer.

close( ): closes a socket, releasing the resources associated with it.

A socket API call refers to the invocation of a socket API function provided by the socket API, enabling the creation, configuration, and management of network sockets for communication between applications over a network.

Message passing is a technique for invoking behavior (i.e., running a program) on a computer. The invoking program sends a message to a process (which may be an actor or object) and relies on that process and its supporting infrastructure to then select and run some appropriate code. Message passing differs from conventional programming where a process, subroutine, or function is directly invoked by name. Message passing is key to some models of concurrency and object-oriented programming.

Message passing is ubiquitous in modern computer software. It is used as a way for the objects that make up a program to work with each other and as means for objects and systems running on different computers (e.g., the Internet) to interact. Message passing may be implemented by various mechanisms, including channels.

The word "distributed" in terms such as "distributed system", "distributed programming", and "distributed algorithm" refers to computer networks where individual computers are physically distributed within some geographical area. A distributed system may have the following characteristics: there are several computational entities (computers or nodes), each of which has its own local memory; and the entities communicate with each other by message passing. Furthermore, a distributed system may have a common goal, such as solving a large computational problem.

A distributed system may be required to tolerate failures in individual entities (e.g., computers). The structure of the distributed system (e.g., network topology, network latency, number of computers) may not be known in advance, the system may consist of different kinds of computers and network links, and the system may change during the execution of a distributed program. A given computer in a distributed system may have only a limited, incomplete view of the system. A given computer may know only one part of the input.

Shared memory (SHM) refers to memory that may be simultaneously accessed by multiple programs or applications with an intent to provide communication among them or avoid redundant copies. In other words, a shared memory channel allows multiple programs or applications to read and write to a common memory area as if it were part of their own address space. This may be achieved by mapping a region of memory that is accessible by both the sending and receiving processes or applications. Shared memory is an efficient means of passing data between programs or applications. Depending on context, programs may run on a single processor or on multiple separate processors. Using memory for communication inside a single program (e.g. among its multiple threads) may also be referred to as shared memory.

TCP applications have a buffering-based architecture. This design allows an application to adjust the sizes of its receive (Rx) and transmit (Tx) buffers. The maintenance of these buffers is the responsibility of the kernel's TCP stack. One of the core features of TCP is its provision of reliable transport, which includes mechanisms for tracking acknowledged data and facilitating the retransmission of lost IP packets, thus safeguarding data integrity. However, a challenge within this architecture is that the application does not know when the data that it has sent is actually read by the recipient. Consequently, data may remain in the Tx/Rx buffer queues. For example, disabling the Nagle algorithm ensures that the data is attempted to be sent to the network, but the data itself may still remain in the Tx or Rx buffer space, and the sender application is not able to know if the intended recipient has received the data. Disabling the Nagle algorithm may result in reduced throughput.

Shared memory, on the other hand, provides direct memory access to read and write memory. Communication over shared memory is reliable, and the central processing unit (CPU) hardware assisted data prefetch can be used to accelerate the communication throughput and minimize latency. Thus, shared memory can be used to gain improved throughput and lower latency compared to TCP packet processing. In general, network switches and network interface cards (NICs) have higher latency compared to the shared memory access. For example, shared memory based on the compute express link (CXL) standard may have an access latency of approximately 200 nanoseconds, whereas NIC access latencies through the network switch may have a latency of over 10 000 nanoseconds, because of the network switches and the endpoint NIC and TCP stack processing. Furthermore, application and kernel-related TCP message processing adds additional latency.

CXL is an open standard for high-speed, high-capacity CPU-to-device and CPU-to-memory connections, designed for high-performance data center computers. CXL may be based on the serial peripheral component interconnect express (PCIe) physical and electrical interface and may include the PCIe-based block input/output protocol (CXL.io) and new cache-coherent protocols for accessing system memory (CXL.cache) and device memory (CXL.mem). The serial communication and pooling capabilities allow CXL memory to overcome performance and socket packaging limitations of dual in-line memory modules (DIMMs), when implementing high storage capacities.

TCP/IP provides reliable transport for data stream reading and writing between client and server applications. However, with TCP/IP, communication increases in cloud networks because of the distributed nature of the microservice architecture. This increases the overhead and latency for communication.

Furthermore, the required increase of security measures in distributed environments, where old monolithic executables are split to several functions, add extra overhead and thus lower the messaging throughput and latencies.

Moreover, while transmitting the message from sender to receiver, multiple copies of the message need to be created to enable the ownership of the message in the IP network. This problem is further amplified with containerization. This increases the used CPU instructions for message processing and thus lowers the throughput and increases the latency.

Overall, the issues associated with TCP/IP in terms of the network may include: high latency, retransmissions due to lost IP packets, congestion handling, IP packet fragmentation, and the TCP stack's high CPU usage.

In some cases, there may be a possibility to use shared memory for communication between the client and server applications to overcome these issues associated with TCP/IP. However, there is a challenge in how to adapt applications using the TCP socket API to use the shared memory without needing to change the whole application architecture.

In some example embodiments, one or more socket API functions may be replaced with one or more customized socket API functions for at least one of a TCP client application or a TCP server application, wherein the one or more customized socket API functions are configured at least to create one or more shared memory channels for communication between the TCP client application and the TCP server application. In other words, one or more original socket API functions may be overridden with one or more custom implementations that are used instead of the original socket API function(s) in an application. This replacing or overriding may also be referred to as socket API interception.

In this way, the underlying transport mechanism of the socket API may be seamlessly and transparently replaced with shared-memory-based communication channels without having to make changes to the source code of the applications.

The example embodiments described herein may provide the following technical advantages in comparison to using TCP sockets for communication: reduced latency, improved throughput (high bandwidth data sharing), no need for kernel TCP stack CPU processing, minimized number of message copies during transportation, reliable communication without data loss and data retransmission, data in shared memory may be hidden from other applications even without encryption, no need for additional internet protocol security (IPsec) enforcement, and no fragmentation of the messages.

For example, communication overhead may be reduced when using the shared memory as a transport mechanism, due to faster access and throughput times of shared memory channel compared to TCP/IP stream.

Moreover, shared memory eliminates the need for data to be copied between the sender and receiver, and therefore message copies during the message transport may be minimized as the message itself can be created by the sender and later read by the reader from the same memory location.

Only the ownership of the access to the memory location may be transmitted. This can be done utilizing a standard API compatible with the socket interface and interception from standard ethernet transport to shared memory implementation. This makes communication reliable, more secure and lowers the latency, as it eliminates almost completely the need to reproduce copies of the messages for the next transmission leg.

The socket API interception can be done in case both the TCP client application and the TCP server applications are running on the same node or host, or if the TCP client application and the TCP server application are running in separate nodes that have access to shared memory via a memory interconnect. For example, the CXL standard defines a mechanism for sharing the memory between different nodes using the PCIe interface, which makes it possible to use shared memory for communication between the TCP client application and the TCP server application running on different nodes. In these cases, TCP/IP is not needed for communication between the TCP client application and the TCP server application.

Figure 2A:
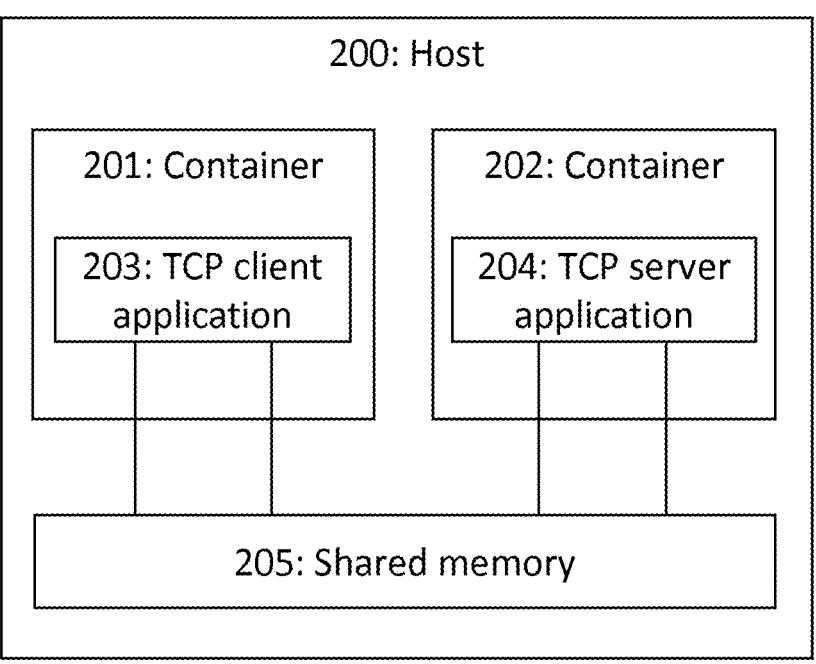
FIG. 2A illustrates an example of a system.

FIG. 2A illustrates an example of a system, to which some example embodiments may be applied. In FIG. 2A, the TCP client application 203 is comprised in a first container 201 within a host 200, and the TCP server application 204 is comprised in a second container 202 within the host 200. In other words, in this example, the TCP client application 203 and the TCP server application 204 are comprised in the same host 200. The TCP client application 203 and the TCP server application 204 are connected to a shared memory 205 of the host 200. The host 200 may refer to, for example, an access node 104 of a radio access network, or any other computing device.

The TCP client application 203 is a computer program that initiates communication with the TCP server application 204 over TCP to request services or resources.

The TCP server application 204 is a computer program that may accept connections and requests from the TCP client application 203, providing the client with specific services or resources in response.

A container 201, 202 is a lightweight, executable unit of software that packages up code and all its dependencies so that the application 203, 204 runs quickly and reliably from one computing environment to another. Containers isolate software from its environment and ensure that it works uniformly despite differences between development and staging, for example.

Figure 2B:
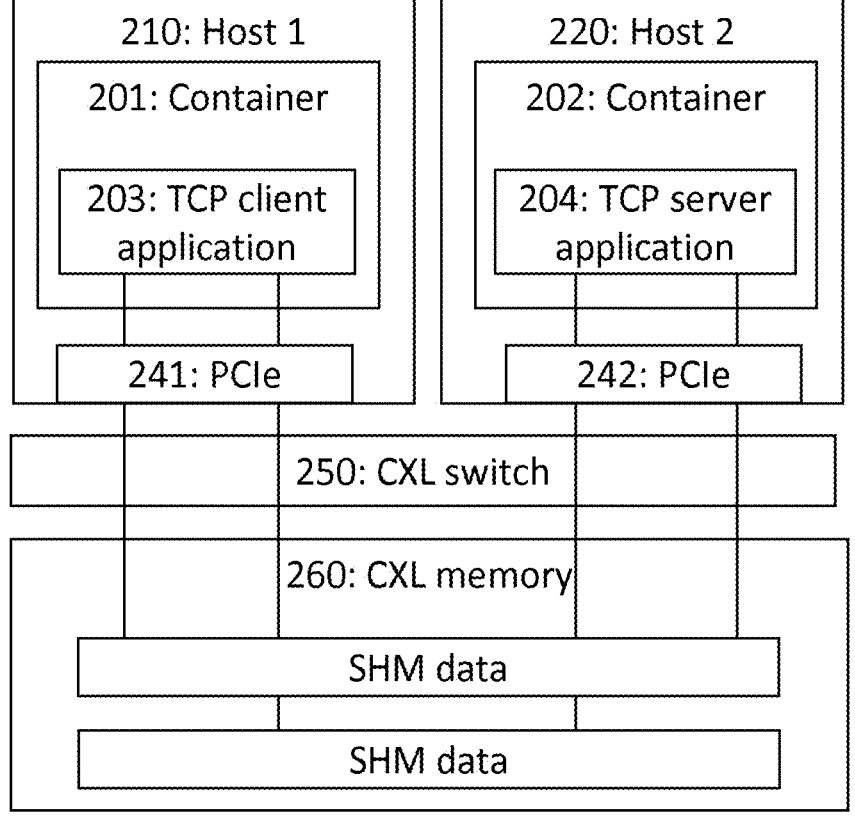
FIG. 2B illustrates an example of a system.

FIG. 2B illustrates another example of a system, to which some example embodiments may be applied. The system of FIG. 2B may be based on version 3.0 or newer of the CXL specification.

In FIG. 2B, the TCP client application 203 is comprised in a first container 201 within a first host 210, and the transmission control protocol server application 204 is comprised in a second container 202 within a second host 220 different from the first host 210. In other words, in this example, the TCP client application 203 and the TCP server application 204 are comprised in separate hosts 210, 220.

For example, the first host 210 may refer to a distributed unit 105 of a radio access network, and the second host 220 may refer to a central unit 108 of the radio access network. As another example, the first host 210 may refer to a computer that is part of a computer cluster (e.g., in a data center), and the second host 220 may refer to another computer that is part of the computer cluster. A given host can send and receive data over the network and is identified by a network address, which can be an IP address in IP networks.

For example, the TCP client application 203 may be connected to a CXL memory 260 (i.e., shared memory) via a CXL switch 250 and a PCIe interface 241 of the first host 210, and the TCP server application 204 may be connected to the same CXL memory 260 via the CXL switch 250 and a PCIe interface 242 of the second host 220.

The CXL switch 250 is a device that facilitates the connection and communication between different components or hosts 210, 220 in a computing system using the CXL protocol. The CXL switch 250 may be designed to facilitate high-speed, efficient interconnectivity between processors, memory devices, and accelerators (e.g., graphics processing units) within a computing system. The CXL switch 250 may be functionally similar to an Ethernet switch. With the CXL switch 250, the connectivity between the components or hosts 210, 220 can be done using direct cabling similarly as with Ethernet.

The CXL memory 260 refers to memory resources that are accessible over the PCIe interfaces 241, 242. The CXL memory 260 can be pooled and shared across different devices or hosts in a computing system or cluster. The CXL memory 260 is one option for implementing the shared memory, but other options may also be possible.

FIG. 3 illustrates a flow chart according to an example embodiment of a method for socket API interception. The method of FIG. 3 may be performed by an apparatus 1300 depicted in FIG. 13. The apparatus 1300 may comprise the host 200 of FIG. 2A, or the first host 210 or the second host 220 of FIG. 2B. For example, the apparatus 1300 may be, or comprise, or be comprised in, an access node 104 or a distributed unit 105 or a central unit 108 of a radio access network, or a computer of a computer cluster.

Referring to FIG. 3, in block 301, one or more socket application programming interface functions are replaced with one or more customized socket application programming interface functions for at least one of a transmission control protocol client application 203 or a transmission control protocol server application 204.

The replacing may be performed without modifying any source code of the transmission control protocol client application 203 and the transmission control protocol server application 204. Some examples of how to do the replacing are described below with reference to FIGS. 4 to 7.

The one or more socket application programming interface functions are configured (or comprise instructions) at least to create one or more transmission control protocol sockets for communication between the transmission control protocol client application 203 and the transmission control protocol server application 204. These one or more socket application programming interface functions may also be referred to as one or more original socket application programming interface functions.

For example, the one or more socket application programming interface functions may include at least one of: socket( ), bind( ), connect( ), listen( ), or accept( ).

The one or more customized socket application programming interface functions are configured (or comprise instructions) at least to create one or more shared memory channels for the communication between the transmission control protocol client application 203 and the transmission control protocol server application 204. The one or more customized socket application programming interface functions may also be referred to as one or more alternative socket application programming interface functions.

The one or more customized socket application programming interface functions may be further configured (or comprise instructions) to create the one or more transmission control protocol sockets. Alternatively, the one or more customized socket application programming interface functions may be configured to create the one or more shared memory channels, but not the one or more transmission control protocol sockets.

In block 302, the one or more customized socket application programming interface functions are called for creating the one or more shared memory channels for the communication between the transmission control protocol client application 203 and the transmission control protocol server application 204.

A shared memory channel refers to a communication mechanism between the applications 203, 204, where they access and exchange data through a common section of memory, eliminating the need for data to be copied between them and thereby improving communication efficiency.

The one or more shared memory channels may be based on a memory interconnect.

The one or more shared memory channels may be comprised in one or more anonymous memory files. In other words, the one or more shared memory channels may be created as anonymous memory files that are not accessible by other processes in the system, in which case there is no need for encrypting exchanged data over shared memory. Management of channels, access control to them and monitoring of their usage is happening within and by predefined processes and pods, so that the shared memory channels are all the time under governance and control of the system. Tapping of a shared memory channel cannot be done as easily as tapping of a port of a Unix node from outside of the cluster's operating system. Anonymous shared memory does not have a name associated with it, and therefore the TCP client and server applications should have some way of communicating or inheriting the reference to this shared memory space to use it. This can be done through mechanisms like passing file descriptors between the TCP client and server applications.

As an alternative to the anonymous memory files, when creating the one or more shared memory channels, a name or an identifier may be allocated to the one or more shared memory channels for identifying and accessing the one or more shared memory channels. This named shared memory creates a named entry in a namespace (e.g., a file system namespace) that the TCP client and server applications can use to access the shared memory by referring to its name or identifier. In other words, once a shared memory channel is given a name or identifier, the applications can "bind" to this shared memory by using the name or identifier. This means that, as long as the applications know the name or identifier, they can access the shared memory directly without any additional setup or coordination between them. Using a name or identifier for shared memory channels simplifies the process of sharing memory between the applications. Any process that knows the name or identifier can access the shared memory, provided it has the appropriate permissions. This makes setup and communication more straightforward. Furthermore, there is no need for an initial communication link or mechanism to share the memory reference between the applications that need to use the shared memory. Instead, the applications can independently access the shared memory by knowing its name or identifier.

FIG. 4 illustrates a flow chart according to an example embodiment of a method for replacing the one or more socket API functions with the one or more customized socket API functions in block 301 above. The method of FIG. 4 may be performed by the apparatus 1300 depicted in FIG. 13.

Referring to FIG. 4, in block 401, a shared library may be preloaded into the transmission control protocol client application 203 and the transmission control protocol server application 204 when starting the transmission control protocol client application 203 and the transmission control protocol server application 204. The shared library comprises the one or more customized socket application programming interface functions that use shared memory channels. For example, a startup script (e.g., a shell script) may be used to provide a launcher for starting an application (i.e., the TCP client application or the TCP server application) with the shared library dynamically preloaded. As another example, the application may be started with an environment variable that indicates to preload the shared library into the application.

When the dynamic preloading is used, the TCP client and server applications can use the preloaded shared library without needing to compile the binary executables with the shared library.

Alternatively, the one or more customized socket application programming interface functions may be comprised in a shared library integrated into the transmission control protocol client application 203 and the transmission control protocol server application 204 prior to starting the transmission control protocol client application 203 and the transmission control protocol server application 204. For example, when the TCP client application and the TCP server application are compiled, they may be configured to use the one or more customized socket API functions from the shared library instead of or in addition to the one or more original socket API functions provided by the operating system.

When the TCP client application and the TCP server application both have the same shared library, then the socket communication can use the shared memory between the client and the server.

In block 402, one or more socket application programming interface calls are remapped from the one or more socket application programming interface functions to the one or more customized socket application programming interface functions by using a dynamic linker at a runtime of the at least one of the transmission control protocol client application 203 or the transmission control protocol server application 204.

In other words, the one or more socket API calls may be originally mapped to the one or more (original) socket API functions, and the remapping means that the one or more socket API calls are mapped to the one or more customized socket API functions instead of the one or more (original) socket API functions. After the remapping, the one or more socket API calls can be used to call the one or more customized socket API functions instead of the one or more (original) socket API functions.

For example, when the TCP client application 203 and/or the TCP server application 204 using the socket API is started (and the shared library is set to be preloaded), the dynamic linker may be used to resolve shared object dependencies required by the application to use during its execution. The dynamic linker may perform address remapping for the original socket API function(s) to be replaced and set the application to use the customized socket API function(s) instead of the original socket API function(s).

FIG. 5 illustrates a flow chart according to an example embodiment of a method for replacing the one or more socket API functions with the one or more customized socket API functions in block 301 above. The method of FIG. 5 may be performed by the apparatus 1300 depicted in FIG. 13.

In this example embodiment, the one or more customized socket API functions may be comprised in a kernel of an operating system of the apparatus 1300. In other words, the one or more customized socket API functions may be integrated directly into the kernel of the operating system.

Referring to FIG. 5, in block 501, a loadable kernel module is used to intercept and redirect one or more system calls from the one or more (original) socket application programming interface functions to the one or more customized socket application programming interface functions.

A loadable kernel module is a piece of code that can be added to the kernel at runtime. This means that it is possible to extend the functionalities of the kernel without needing to reboot the operating system.

The kernel is the core component of the operating system, managing the system's resources and the communication between hardware and software components.

The kernel operates in a privileged mode called the kernel space, while applications (e.g., the TCP client application and the TCP server application) run in a restricted mode known as the user space. This separation ensures security and stability by preventing user-space applications from directly accessing or modifying critical system resources. Socket operations, being closely tied to the system's network stack and hardware, are managed by the kernel, and thus socket API function calls may transition from the user space to the kernel space.

System calls are interfaces between the user-space applications (e.g., the TCP client or server application) and the kernel-space services. When an application needs to perform an operation that requires privileged access to hardware resources or sensitive system functions (e.g., creating a network connection), it makes a system call.

Intercepting a system call means that when an application tries to execute that call, the call is caught or trapped by another piece of code before it reaches its original destination in the kernel. Redirecting a system call means that after intercepting it, the call is sent to a different function than originally intended (i.e., to the one or more customized socket API functions rather than the one or more original socket API functions) This technique allows for the dynamic modification of network behavior without altering or recompiling the kernel.

FIG. 6 illustrates a flow chart according to an example embodiment of a method for replacing the one or more socket API functions with the one or more customized socket API functions in block 301 above. The method of FIG. 6 may be performed by the apparatus 1300 depicted in FIG. 13.

In this example embodiment, the one or more customized socket API functions may be comprised in a kernel of an operating system of the apparatus 1300.

Referring to FIG. 6, in block 601, the kernel of the operating system of the apparatus 1300 is modified to direct one or more calls to the one or more customized socket application programming interface functions. Herein the one or more calls may refer to systems calls or user-space calls (i.e., calls made by the TCP client and/or server applications within the user space).

In other words, the kernel may be modified to reroute certain types of calls (system calls from within the kernel space or calls made from user-space applications) to the one or more customized socket API functions (instead of the one or more original socket API functions).

FIG. 7 illustrates a flow chart according to an example embodiment of a method for replacing the one or more socket API functions with the one or more customized socket API functions in block 301 above. The method of FIG. 7 may be performed by the apparatus 1300 depicted in FIG. 13.

In this example embodiment, the one or more customized socket API functions may be comprised in a kernel of an operating system of the apparatus 1300.

Referring to FIG. 7, in block 701, a transport mechanism is added within the kernel of the operating system of the apparatus for utilizing the one or more shared memory channels for the communication between the transmission control protocol client application and the transmission control protocol server application.

A transport mechanism refers to a process used to move data between different parts of a computer or network. By adding a new transport mechanism within the kernel, this process is integrated at a low level within the operating system, potentially offering improved efficiency and performance for data transfer operations.

By adding the transport mechanism that uses shared memory, the socket API functions can be customized or extended to check if both the TCP client and server applications support this transport mechanism. If so, these functions can redirect data transfer operations to use the shared memory channels instead of the TCP/IP network stack.

In other words, the one or more customized socket application programming interface functions may be configured to support the transport mechanism added within the kernel. When the TCP client or server application uses these customized socket API functions, they can leverage the efficient shared memory-based communication facilitated by the transport mechanism added within the kernel.

Figure 8:
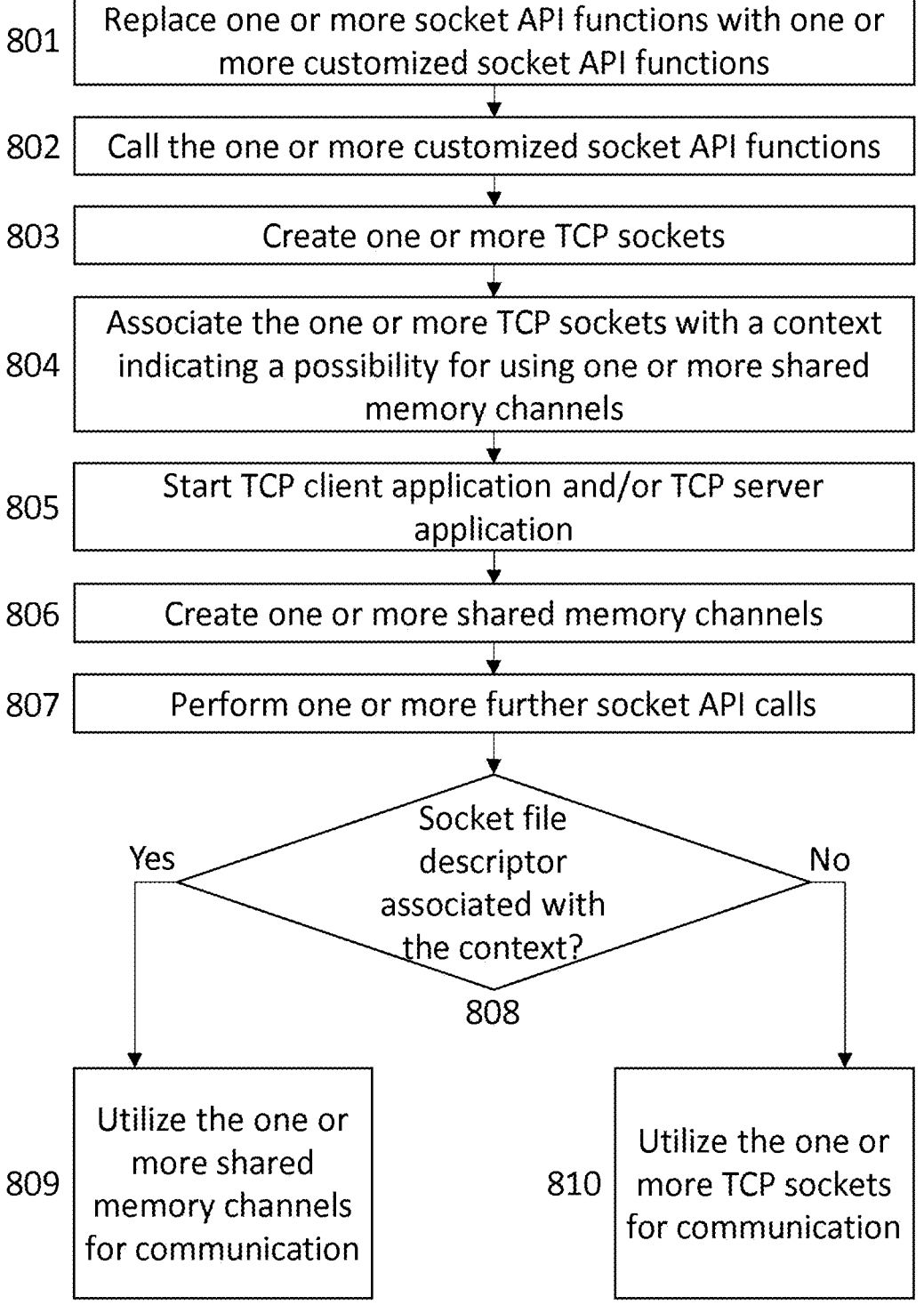
FIG. 8 illustrates a flow chart.

FIG. 8 illustrates a flow chart according to an example embodiment of a method for socket API interception. The method of FIG. 8 may be performed by the apparatus 1300 depicted in FIG. 13.

Referring to FIG. 8, in block 801, one or more socket application programming interface functions are replaced with one or more customized socket application programming interface functions for at least one of a transmission control protocol client application 203 or a transmission control protocol server application 204. The replacing may be performed without modifying any source code of the transmission control protocol client application 203 and the transmission control protocol server application 204 (e.g., as described above with reference to any of FIGS. 4 to 7).

In this example embodiment, the one or more customized socket application programming interface functions are configured to: create one or more transmission control protocol sockets for the communication between the transmission control protocol client application 203 and the transmission control protocol server application 204; and create one or more shared memory channels for the communication between the transmission control protocol client application 203 and the transmission control protocol server application 204.

In block 802, the one or more customized socket application programming interface functions are called for creating the one or more transmission control protocol sockets and the one or more shared memory channels for the communication between the transmission control protocol client application 203 and the transmission control protocol server application 204.

In block 803, the one or more transmission control protocol sockets are created (on both the client and server sides).

In block 804, the one or more transmission control protocol sockets are associated or assigned with a context indicating a possibility for using the one or more shared memory channels as an alternative to the one or more transmission control protocol sockets.

For example, when a socket is created by calling the socket( ) function, the socket may be given an initial candidate context, if the created socket is a TCP socket. The candidate context may indicate the possibility for the associated socket to establish a shared memory connection or to become a server with support for shared memory channel establishment.

In block 805, the at least one of the transmission control protocol client application or the transmission control protocol server application is started based on the context indicating the possibility for using the one or more shared memory channels, such that the at least one of the transmission control protocol client application or the transmission control protocol server application is configured to support the one or more shared memory channels for the communication between the transmission control protocol client application and the transmission control protocol server application (as described below in block 806).

In block 806, the one or more shared memory channels are created. The one or more shared memory channels may be created based on a type and an address of the one or more transmission control protocol sockets.

For example, the shared memory establishment flow may consist of calls to customized socket( ), connect( ), listen( ) and accept( ) functions.

After the socket has been created with the socket( ) function (in block 803), the call sequence of socket API functions depends on the role of the application in the connection establishment.

In the server side, the TCP server application may next call bind( ) to bind a port number to the socket, i.e., set the address for the server that will be started in listen( ). When listen( ) is called (to start listening to the socket), the customized listen( ) function may first start the TCP server requested by the call as normal but, in addition, if the socket has a candidate context, it may also start a Unix domain server identifiable by the TCP server address and mark the context to be for a server.

Figure 11:
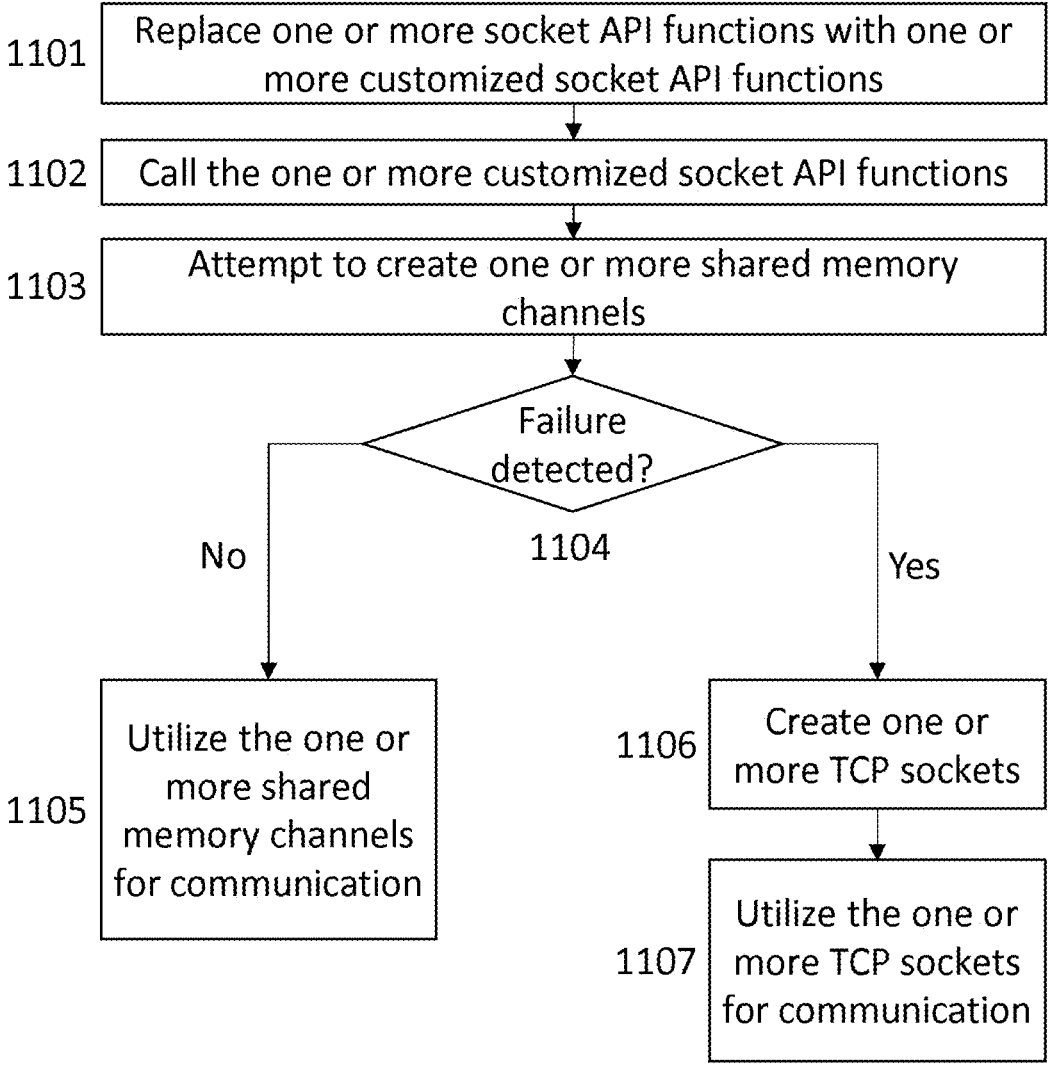
FIG. 11 illustrates a flow chart.

In the client side, after an optional call to bind( ), the TCP client application may call connect( ) to establish a connection to a server, the address of which is given as a parameter to the call. The customized connect( ) function may first try to establish a connection to a Unix domain server identified by the given server address. If not successful, the original connect( ) function may be called with the given parameters to establish a TCP connection. However, if a connection is successfully established to a Unix domain server, the server and client may begin the shared memory connection establishment procedure. For example, the client may request the one or more shared memory channels to be created, and the server may then create the one or more shared memory channels and reply the channel. In case the procedure fails at any point, the customized connect( ) function may fall back to trying to establish a normal TCP connection (e.g., as shown in FIG. 11).

Once the TCP client application has successfully connected to the Unix domain server associated with the targeted TCP server, it begins the shared memory channel establishment procedure. On the server side, the Unix domain server may use background threads to accept new connections and handle shared memory connection establishments. Once both peers are connected, one or more shared memory channels are created and shared between the peers using the established Unix domain socket connection, which may utilize a file descriptor passing feature of Unix domain socket connections supported by Linux. Finally, the peers may send confirmations of the successfully established shared memory connection and assign the established shared memory channel(s) to the context associated with the TCP socket. On the server side, the connection may be added to a custom backlog queue where the TCP server application can obtain the connection in call to accept( ).

In the above, Unix has been used as an example of an operating system, but it should be noted that any other operating system may alternatively be used by adapting the process accordingly.

In block 807, one or more further socket application programming interface calls associated with one or more socket file descriptors are performed or made. A socket file descriptor is an integer value used by an application to uniquely identify an open socket as part of the operating system's file descriptor table, allowing for the manipulation and management of socket operations through the socket API.

Once the shared memory connection has been successfully established and the client or server returns successfully from connect( ) or accept( ), respectively, further calls to the socket API functions use the established shared memory connection for sending and receiving data.

In block 808, it is determined whether the one or more socket file descriptors are associated with the context indicating the possibility for using the one or more shared memory channels.

In other words, the customized socket API function(s) may first search for a context for a given socket file descriptor. If the context is found, the given data to be sent is written to the shared memory channel indicated in the context. Otherwise, if the context is not found, the respective original socket API function may be called with the given arguments. The sequence is similar for the read functions as well.

For example, the shared library may keep track of replaced socket file descriptors in a mapping from file descriptors to their context. When the TCP client or server application calls a socket API function, the library calls may first perform a context lookup for the socket file descriptor and if a context exists, use an established shared memory connection from the context instead of the TCP socket for the requested action. All actions of the shared library may be performed transparently, so that, from the perspective of the TCP client or server application, it seems that TCP sockets are being used as expected.

In block 809, based at least on determining that the one or more socket file descriptors are associated with the context (block 808: yes), the one or more shared memory channels are utilized for the communication between the transmission control protocol client application and the transmission control protocol server application according to the one or more further socket application programming interface calls.

The utilization of the one or more shared memory channels for the communication may comprise at least one of: writing, by the transmission control protocol client application or the transmission control protocol server application, one or more messages in the one or more shared memory channels; or reading, by the transmission control protocol server application or the transmission control protocol client application, the one or more messages from the one or more shared memory channels.

In other words, read and write procedures for both directions can be carried via the shared memory channel(s). When all the data is transmitted, the shared memory connection may be closed or terminated.

Alternatively, in block 810, based at least on determining that the one or more socket file descriptors are not associated with the context (block 808: no), the one or more transmission control protocol sockets are utilized for the communication between the transmission control protocol client application and the transmission control protocol server application according to the one or more further socket application programming interface calls.

FIG. 9 illustrates a flow chart according to an example embodiment of a method for socket API interception. The method of FIG. 9 may be performed by the apparatus 1300 depicted in FIG. 13.

Referring to FIG. 9, in block 901, one or more socket application programming interface functions are replaced with one or more customized socket application programming interface functions for at least one of a transmission control protocol client application 203 or a transmission control protocol server application 204. The replacing may be performed without modifying any source code of the transmission control protocol client application 203 and the transmission control protocol server application 204 (e.g., as described above with reference to any of FIGS. 4 to 7).

In this example embodiment, the one or more customized socket application programming interface functions are configured to create one or more transmission control protocol sockets for the communication between the transmission control protocol client application 203 and the transmission control protocol server application 204, and to create one or more shared memory channels for the communication between the transmission control protocol client application 203 and the transmission control protocol server application 204.

In block 902, the one or more customized socket application programming interface functions are called for creating the one or more transmission control protocol sockets and the one or more shared memory channels for the communication between the transmission control protocol client application 203 and the transmission control protocol server application 204.

In block 903, the one or more transmission control protocol sockets are created.

In block 904, it is determined whether the one or more shared memory channels are available for the communication.

In block 905, based at least on determining that the one or more shared memory channels are available for the communication (block 904: yes), the one or more shared memory channels are created. For example, the one or more shared memory channels may be created based on a type and an address of the one or more transmission control protocol sockets.

In block 906, following block 905, the one or more shared memory channels are utilized for the communication between the transmission control protocol client application and the transmission control protocol server application.

Alternatively, in block 907, based at least on determining that the one or more shared memory channels are not available for the communication (block 904: no), the one or more transmission control protocol sockets are utilized for the communication between the transmission control protocol client application and the transmission control protocol server application.

Figure 10:
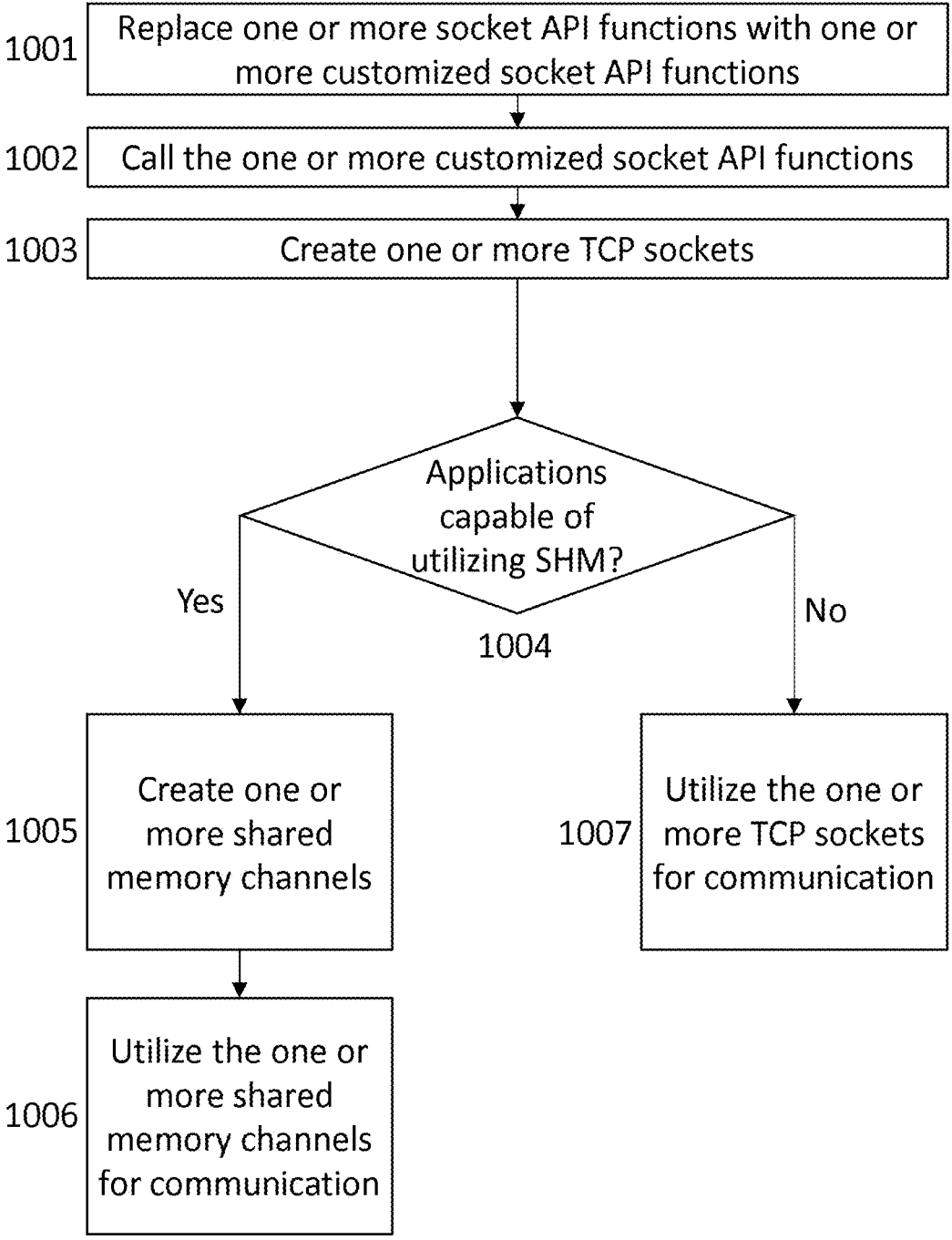
FIG. 10 illustrates a flow chart.

FIG. 10 illustrates a flow chart according to an example embodiment of a method for socket API interception. The method of FIG. 10 may be performed by the apparatus 1300 depicted in FIG. 13.

Referring to FIG. 10, in block 1001, one or more socket application programming interface functions are replaced with one or more customized socket application programming interface functions for at least one of a transmission control protocol client application 203 or a transmission control protocol server application 204. The replacing may be performed without modifying any source code of the transmission control protocol client application 203 and the transmission control protocol server application 204 (e.g., as described above with reference to any of FIGS. 4 to 7).

In this example embodiment, the one or more customized socket application programming interface functions are configured to create one or more transmission control protocol sockets for the communication between the transmission control protocol client application 203 and the transmission control protocol server application 204, and to create one or more shared memory channels for the communication between the transmission control protocol client application 203 and the transmission control protocol server application 204.

In block 1002, the one or more customized socket application programming interface functions are called for creating the one or more transmission control protocol sockets and the one or more shared memory channels for the communication between the transmission control protocol client application 203 and the transmission control protocol server application 204.

In block 1003, the one or more transmission control protocol sockets are created.

In block 1004, it is determined whether the transmission control protocol client application and the transmission control protocol server application are capable of utilizing the one or more shared memory channels.

For example, the transmission control protocol client application and the transmission control protocol server application may be determined to be capable of utilizing the one or more shared memory channels, if the transmission control protocol client application and the transmission control protocol server application are running on a same node or host 200, or if the transmission control protocol client application and the transmission control protocol server application are running on separate nodes or hosts 210, 220 connected to a shared memory 260.

In block 1005, based at least on determining that the transmission control protocol client application and the transmission control protocol server application are capable of utilizing the one or more shared memory channels (block 1004: yes), the one or more shared memory channels are created. For example, the one or more shared memory channels may be created based on a type and an address of the one or more transmission control protocol sockets.

In block 1006, following block 1005, the one or more shared memory channels are utilized for the communication between the transmission control protocol client application and the transmission control protocol server application.

Alternatively, in block 1007, based at least on determining that the transmission control protocol client application 203 and the transmission control protocol server application 204 are not capable of utilizing the one or more shared memory channels (block 1004: no), the one or more transmission control protocol sockets are utilized for the communication between the transmission control protocol client application and the transmission control protocol server application.

In another example embodiment, the one or more shared memory channels may be utilized for the communication between the transmission control protocol client application and the transmission control protocol server application, based on determining that the one or more shared memory channels are available for the communication (block 905: yes), and based on determining that the transmission control protocol client application and the transmission control protocol server application are capable of utilizing the one or more shared memory channels (block 1005: yes).

FIG. 11 illustrates a flow chart according to an example embodiment of a method for socket API interception. The method of FIG. 11 may be performed by the apparatus 1300 depicted in FIG. 13.

Referring to FIG. 11, in block 1101, one or more socket application programming interface functions are replaced with one or more customized socket application programming interface functions for at least one of a transmission control protocol client application 203 or a transmission control protocol server application 204. The replacing may be performed without modifying any source code of the transmission control protocol client application 203 and the transmission control protocol server application 204 (e.g., as described above with reference to any of FIGS. 4 to 7).

In this example embodiment, the one or more customized socket application programming interface functions are configured to attempt to create one or more shared memory channels for the communication between the transmission control protocol client application 203 and the transmission control protocol server application 204, and, if there is a failure in creating the one or more shared memory channels, to create one or more transmission control protocol sockets for the communication between the transmission control protocol client application 203 and the transmission control protocol server application 204.

In block 1102, the one or more customized socket application programming interface functions are called for creating the one or more transmission control protocol sockets or the one or more shared memory channels for the communication between the transmission control protocol client application 203 and the transmission control protocol server application 204.

In block 1103, there is an attempt to create the one or more shared memory channels.

In block 1104, it is determined whether a failure associated with the one or more shared memory channels is detected. For example, it may be determined whether there was a failure in creating the one or more shared memory channels.

In block 1105, based at least on determining that the failure is not detected (block 1104: no), the one or more shared memory channels are utilized for the communication between the transmission control protocol client application and the transmission control protocol server application. In other words, the one or more shared memory channels are utilized for the communication, if the one or more shared memory channels were successfully created.

Alternatively, in block 1106, based at least on determining that the failure is detected (block 1104: yes), the one or more transmission control protocol sockets are created. In other words, the one or more customized socket application programming interface functions may be configured to create the one or more transmission control protocol sockets as a fallback option, in case there was a failure in creating the one or more shared memory channels.

In block 1107, following block 1106, the one or more transmission control protocol sockets are utilized for the communication between the transmission control protocol client application and the transmission control protocol server application.

Figure 12:
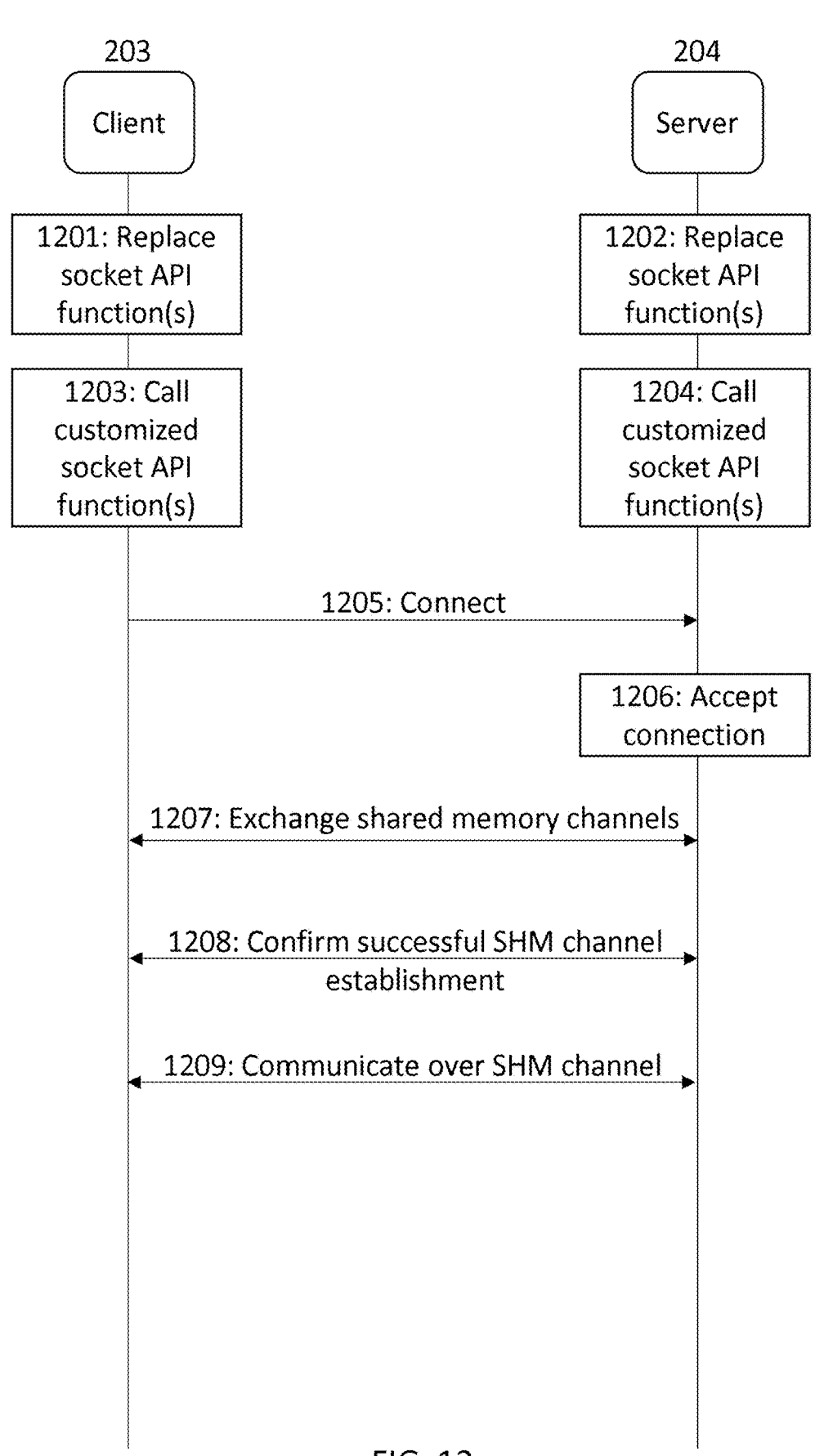
FIG. 12 illustrates a signal flow diagram.

FIG. 12 illustrates a signal flow diagram according to an example embodiment.

Referring to FIG. 12, at 1201, a first host 210 comprising the TCP client application 203 replaces one or more socket application programming interface functions with one or more customized socket application programming interface functions for the transmission control protocol client application (e.g., as described above with reference to any of FIGS. 4 to 7).

At 1202, a second host 220 comprising the TCP server application 204 replaces the one or more socket application programming interface functions with the one or more customized socket application programming interface functions for the transmission control protocol server application (e.g., as described above with reference to any of FIGS. 4 to 7).

At 1203, the first host 210 (or the TCP client application 203) calls the one or more customized socket application programming interface functions for creating the one or more shared memory channels for the communication between the transmission control protocol client application and the transmission control protocol server application.

At 1204, the second host 220 (or the TCP server application 204) calls the one or more customized socket application programming interface functions. For example, the second host 220 (or the TCP server application 204) may call the listen( ) function and wait for an incoming connection request from the first host 210 (or from the TCP client application 203).

At 1205, based on calling the one or more customized socket application programming interface functions (e.g., the connect( ) function), the first host 210 (or the TCP client application 203) requests a connection to the second host 220 (or to the TCP server application 204).

At 1206, the second host 220 (or the TCP server application 204) accepts the connection (e.g., by calling the accept( ) function), and the connection between the TCP client application 203 and the TCP server application 204 is established. For example, this connection may be established by utilizing the one or more transmission control protocol sockets, which may also be created by the one or more customized socket API functions.

At 1207, once the TCP client application 203 and the TCP server application 204 are connected, the one or more shared memory channels are created and shared between the TCP client application 203 and the TCP server application 204 using the established (socket) connection.

At 1208, the TCP client application 203 and the TCP server application 204 send a confirmation to each other of the successfully created one or more shared memory channels.

At 1209, the TCP client application 203 and the TCP server application 204 may communicate with each other by utilizing the one or more shared memory channels.

The blocks, related functions, and information exchanges described above by means of FIGS. 3 to 12 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

Figure 13:
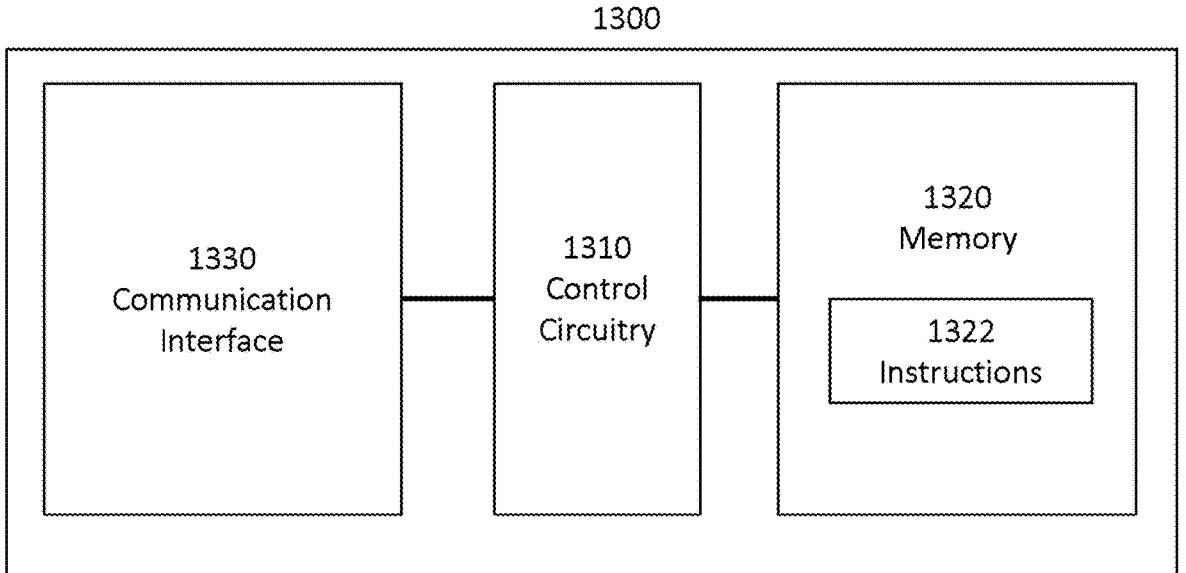
FIG. 13 illustrates an example of an apparatus.

FIG. 13 illustrates an example of an apparatus 1300 comprising means for performing one or more of the example embodiments (e.g., the method of FIG. 4) described above. The apparatus 1300 may comprise the host 200 of FIG. 2A, or the first host 210 or the second host 220 of FIG. 2B. For example, the apparatus 1300 may be, or comprise, or be comprised in, an access node 104 or a distributed unit 105 or a central unit 108 of a radio access network, or a computer of a computer cluster.

The apparatus 1300 may comprise, for example, a circuitry or a chipset applicable for realizing one or more of the example embodiments described above. The apparatus 1300 may be an electronic device or computing system comprising one or more electronic circuitries. The apparatus 1300 may comprise a control circuitry 1310 such as at least one processor, and at least one memory 1320 storing instructions 1322 which, when executed by the at least one processor, cause the apparatus 1300 to carry out one or more of the example embodiments described above. Such instructions 1322 may, for example, include computer program code (software). The at least one processor and the at least one memory storing the instructions may provide the means for providing or causing the performance of any of the methods and/or blocks described above.

In another embodiment, the means may be a network function of the core network 110, or the means may be network function virtualization infrastructure.

The processor is coupled to the memory 1320. The processor is configured to read and write data to and from the memory 1320. The memory 1320 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 1320 stores computer readable instructions that are executed by the processor. For example, non-volatile memory stores the computer readable instructions, and the processor executes the instructions using volatile memory for temporary storage of data and/or instructions.

The computer readable instructions may have been pre-stored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

The memory 1320 may be implemented using any suitable data storage technology, such as semiconductor-based memory devices, flash memory, magnetic memory devices and systems, optical memory devices and systems, fixed memory and/or removable memory.

The apparatus 1300 may further comprise or be connected to a communication interface 1330 comprising hardware and/or software for realizing communication connectivity according to one or more communication protocols. The communication interface 1330 may comprise at least one transmitter (Tx) and at least one receiver (Rx) that may be integrated to the apparatus 1300 or that the apparatus 1300 may be connected to. The communication interface 1330 may provide means for performing some of the blocks and/or functions (e.g., transmitting and receiving) for one or more example embodiments described above. The communication interface 1330 may comprise one or more components, such as: power amplifier, digital front end (DFE), analog-to-digital converter (ADC), digital-to-analog converter (DAC), frequency converter, (de) modulator, and/or encoder/decoder circuitries, controlled by the corresponding controlling units.

The communication interface 1330 provides the apparatus with communication capabilities (e.g., for communicating in the wireless communication network of FIG. 1). The communication interface 1330 may, for example, provide a radio, cable, fiber and/or shared memory interface to one or more other nodes or hosts.

It is to be noted that the apparatus 1300 may further comprise various components not illustrated in FIG. 13. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable), i) a combination of analog and/or digital hardware circuit(s) with software/firmware and ii) any portions of hardware processor(s) with software (including digital signal processor(s), software, and memory (ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways within the scope of the claims. The embodiments are not limited to the example embodiments described above, but may vary within the scope of the claims. Therefore, all words and expressions should be interpreted broadly, and they are intended to illustrate, not to restrict, the embodiments.

The invention claimed is:

1. An apparatus comprising at least one processor, and at least one memory storing instructions that, when executed by the at least one processor, cause the apparatus at least to:
    replace one or more socket application programming interface functions with one or more customized socket application programming interface functions for at least one of a transmission control protocol client application or a transmission control protocol server application,
    wherein the replacing is performed without modifying any source code of the transmission control protocol client application and the transmission control protocol server application,
    wherein the one or more socket application programming interface functions are configured at least to create one or more transmission control protocol sockets for communication between the transmission control protocol client application and the transmission control protocol server application,
    wherein the one or more customized socket application programming interface functions are configured at least to create one or more shared memory channels for the communication between the transmission control protocol client application and the transmission control protocol server application;
    call the one or more customized socket application programming interface functions for creating the one or more shared memory channels for the communication between the transmission control protocol client application and the transmission control protocol server application;
    detect a failure associated with the one or more shared memory channels; and
    based on detecting the failure, utilize the one or more transmission control protocol sockets for the communication between the transmission control protocol client application and the transmission control protocol server application.

2. The apparatus of claim 1, wherein the replacing comprises remapping one or more socket application programming interface calls from the one or more socket application programming interface functions to the one or more customized socket application programming interface functions by using a dynamic linker at a runtime of the at least one of the transmission control protocol client application or the transmission control protocol server application.

3. The apparatus of claim 1, caused to:
    preload a shared library into the transmission control protocol client application and the transmission control protocol server application when starting the transmission control protocol client application and the transmission control protocol server application,
    wherein the shared library comprises the one or more customized socket application programming interface functions.

4. The apparatus of claim 1, wherein the one or more customized socket application programming interface functions are comprised in a shared library integrated into the transmission control protocol client application and the transmission control protocol server application prior to starting the transmission control protocol client application and the transmission control protocol server application.

5. The apparatus of claim 1, wherein the one or more customized socket application programming interface functions are comprised in a kernel of an operating system of the apparatus.

6. The apparatus of claim 5, wherein the replacing comprises using a loadable kernel module to intercept and redirect one or more system calls from the one or more socket application programming interface functions to the one or more customized socket application programming interface functions.

7. The apparatus of claim 5, wherein the replacing comprises modifying the kernel of the operating system of the apparatus to direct one or more calls to the one or more customized socket application programming interface functions.

8. The apparatus of claim 5, caused to:
    add, within the kernel of the operating system of the apparatus, a transport mechanism for utilizing the one or more shared memory channels for the communication between the transmission control protocol client application and the transmission control protocol server application,
    wherein the one or more customized socket application programming interface functions are configured to support the transport mechanism added within the kernel.

9. The apparatus of claim 1, wherein the one or more customized socket application programming interface functions are further configured to create the one or more transmission control protocol sockets.

10. The apparatus of claim 9, wherein the apparatus is caused to create the one or more shared memory channels based on a type and an address of the one or more transmission control protocol sockets.

11. The apparatus of claim 9, wherein the one or more customized socket application programming interface functions are further configured to:
    associate the one or more transmission control protocol sockets with a context indicating a possibility for using the one or more shared memory channels as an alternative to the one or more transmission control protocol sockets, and start the at least one of the transmission control protocol client application or the transmission control protocol server application based on the context indicating the possibility for using the one or more shared memory channels, such that the at least one of the transmission control protocol client application or the transmission control protocol server application is configured to support the one or more shared memory channels for the communication between the transmission control protocol client application and the transmission control protocol server application.

12. The apparatus of claim 11, caused to:

perform one or more further socket application programming interface calls associated with one or more socket file descriptors;

determine whether the one or more socket file descriptors are associated with the context indicating the possibility for using the one or more shared memory channels; and based at least on determining that the one or more socket file descriptors are associated with the context, utilize the one or more shared memory channels for the communication between the transmission control protocol client application and the transmission control protocol server application according to the one or more further socket application programming interface calls.

13. The apparatus of claim 12, wherein the utilization of the one or more shared memory channels for the communication comprises at least one of:

writing, by the transmission control protocol client application or the transmission control protocol server application, one or more messages in the one or more shared memory channels, or reading, by the transmission control protocol server application or the transmission control protocol client application, the one or more messages from the one or more shared memory channels.

14. The apparatus of claim 1, caused to:

determine whether the one or more shared memory channels are available for the communication; and based at least on determining that the one or more shared memory channels are available for the communication, utilize the one or more shared memory channels for the communication between the transmission control protocol client application and the transmission control protocol server application.

15. The apparatus of claim 1, caused to:

determine whether the transmission control protocol client application and the transmission control protocol server application are capable of utilizing the one or more shared memory channels; and based at least on determining that the transmission control protocol client application and the transmission control protocol server application are capable of utilizing the one or more shared memory channels, utilize the one or more shared memory channels for the communication between the transmission control protocol client application and the transmission control protocol server application.

16. The apparatus of claim 1, caused to:

determine whether the one or more shared memory channels are available for the communication; and based on determining that the one or more shared memory channels are not available for the communication, utilize the one or more transmission control protocol sockets for the communication between the transmission control protocol client application and the transmission control protocol server application.

17. The apparatus of claim 1, wherein the transmission control protocol client application is comprised in a first container within a first host, and the transmission control protocol server application is comprised in a second container within a second host different from the first host, wherein the apparatus comprises the first host or the second host.

18. A method comprising:

replacing one or more socket application programming interface functions with one or more customized socket application programming interface functions for at least one of a transmission control protocol client application or a transmission control protocol server application, wherein the replacing is performed without modifying any source code of the transmission control protocol client application and the transmission control protocol server application, wherein the one or more socket application programming interface functions are configured at least to create one or more transmission control protocol sockets for communication between the transmission control protocol client application and the transmission control protocol server application, wherein the one or more customized socket application programming interface functions are configured at least to create one or more shared memory channels for the communication between the transmission control protocol client application and the transmission control protocol server application;

calling the one or more customized socket application programming interface functions for creating the one or more shared memory channels for the communication between the transmission control protocol client application and the transmission control protocol server application;

detecting a failure associated with the one or more shared memory channels; and based on detecting the failure, utilizing the one or more transmission control protocol sockets for the communication between the transmission control protocol client application and the transmission control protocol server application.

19. A non-transitory computer readable medium comprising program instructions which, when executed by an apparatus, cause the apparatus to perform at least the following:

replacing one or more socket application programming interface functions with one or more customized socket application programming interface functions for at least one of a transmission control protocol client application or a transmission control protocol server application, wherein the replacing is performed without modifying any source code of the transmission control protocol client application and the transmission control protocol server application, wherein the one or more socket application programming interface functions are configured at least to create one or more transmission control protocol sockets for communication between the transmission control protocol client application and the transmission control protocol server application, wherein the one or more customized socket application programming interface functions are configured at least to create one or more shared memory channels for the communication between the transmission control protocol client application and the transmission control protocol server application;

calling the one or more customized socket application programming interface functions for creating the one or more shared memory channels for the communication between the transmission control protocol client application and the transmission control protocol server application;

detecting a failure associated with the one or more shared memory channels; and based on detecting the failure, utilizing the one or more transmission control protocol sockets for the communication between the transmission control protocol client application and the transmission control protocol server application.

* * * * *